United States Patent
Takizawa et al.

(10) Patent No.: US 7,623,206 B2
(45) Date of Patent: Nov. 24, 2009

(54) LIQUID CRYSTAL DEVICE BOARD, LIQUID CRYSTAL DEVICE, AND ELECTRONIC APPARATUS

(75) Inventors: Keiji Takizawa, Hotaka (JP); Tadashi Tsuyuki, Shimosuwa (JP)

(73) Assignee: Seiko Epson Corporation (JP)

( * ) Notice: Subject to any disclaimer, the term of this patent is extended or adjusted under 35 U.S.C. 154(b) by 151 days.

(21) Appl. No.: 11/745,169

(22) Filed: May 7, 2007

(65) Prior Publication Data
US 2007/0206138 A1    Sep. 6, 2007

Related U.S. Application Data

(62) Division of application No. 10/205,010, filed on Jul. 25, 2002, now abandoned.

(30) Foreign Application Priority Data

| Jul. 26, 2001 | (JP) | ............................ 2001-226769 |
| Jun. 27, 2002 | (JP) | ............................ 2002-188598 |

(51) Int. Cl.
    G02F 1/1335    (2006.01)
(52) U.S. Cl. ................... 349/114; 349/106; 349/113
(58) Field of Classification Search ................ 349/113, 349/114, 106
    See application file for complete search history.

(56) References Cited

U.S. PATENT DOCUMENTS

| 5,654,782 | A | 8/1997 | Morokawa et al. |
| 6,122,027 | A | 9/2000 | Ogawa et al. |
| 6,195,140 | B1 * | 2/2001 | Kubo et al. .................... 349/44 |
| 6,259,500 | B1 | 7/2001 | Kijima et al. |
| 6,281,952 | B1 | 8/2001 | Okamoto et al. |
| 6,310,672 | B1 | 10/2001 | Koike et al. |
| 6,563,554 | B2 | 5/2003 | Okamoto et al. |
| 6,570,634 | B2 * | 5/2003 | Kim ........................... 349/107 |
| 6,624,860 | B1 * | 9/2003 | Narutaki et al. ............. 349/106 |
| 6,646,702 | B1 * | 11/2003 | Motomura et al. ........... 349/122 |
| 6,683,666 | B1 | 1/2004 | Jang et al. |
| 6,879,359 | B1 | 4/2005 | Kikkawa et al. |

(Continued)

FOREIGN PATENT DOCUMENTS

EP          1 109 053          6/2001

(Continued)

OTHER PUBLICATIONS

Communication from European Patent Office regarding counterpart application.

(Continued)

*Primary Examiner*—Michael H Caley
(74) *Attorney, Agent, or Firm*—Harness, Dickey & Pierce, P.L.C.

(57) ABSTRACT

A first substrate 211 has reflective layer 212 formed thereon, and the reflective layer 212 has one aperture 212a formed therein at each pixel. The reflective layer 212 has coloring layers 214 formed thereon, and the coloring layers 214 have an overcoat layer 215 formed thereon. The overcoat layer 215 has apertures 215a directly above the corresponding apertures 212a. Liquid crystal 232 lies in surface depressions 210a formed so as to correspond to the apertures 215a of the overcoat layer 215 and is thick above the apertures 212a of the reflective layer 212.

17 Claims, 18 Drawing Sheets

U.S. PATENT DOCUMENTS

| | | |
|---|---|---|
| 6,900,863 B2 | 5/2005 | Okamoto et al. |
| 7,050,132 B2 | 5/2006 | Okamoto et al. |
| 2002/0036732 A1 | 3/2002 | Kim |
| 2002/0054269 A1 | 5/2002 | Maeda et al. |
| 2006/0119752 A1 | 6/2006 | Okamoto et al. |

FOREIGN PATENT DOCUMENTS

| | | |
|---|---|---|
| JP | 11-052366 A | 2/1999 |
| JP | 11-101992 | 4/1999 |
| JP | 11-242226 | 9/1999 |
| JP | 11-316382 | 11/1999 |
| JP | 2000-180881 | 6/2000 |
| JP | 2000-267081 | 9/2000 |
| JP | 2000-275660 | 10/2000 |
| JP | 2000-298271 A | 10/2000 |
| JP | 2000-305099 | 11/2000 |
| JP | 2000-305099 A | 11/2000 |
| JP | 2000-305110 | 11/2000 |
| JP | 2001-33778 | 2/2001 |
| JP | 2001-033778 A | 2/2001 |
| JP | 2001-125094 A | 5/2001 |
| JP | 2001-221995 | 8/2001 |
| JP | 2003-107437 A | 4/2003 |
| KR | 2001-0045206 | 6/2001 |
| KR | 2001-0060817 | 7/2001 |
| KR | 2001-0094908 A | 11/2001 |

OTHER PUBLICATIONS

Communication from Korean Patent Office regarding counterpart application.
Examination result corresponding to the Taiwan application.
Japanese Examination Result for 2002-188598.

* cited by examiner

LIQUID CRYSTAL DEVICE BOARD, LIQUID CRYSTAL DEVICE, AND ELECTRONIC APPARATUS

CROSS-REFERENCE TO RELATED APPLICATIONS

This application is a divisional of U.S. Ser. No. 10/205,010 filed Jul. 25, 2002, which claims priority to Japanese Application Nos. 2001-226769 filed Jul. 26, 2001 and 2002-188598 filed Jun. 27, 2002, all of which are hereby incorporated by reference.

BACKGROUND OF THE INVENTION

1. Technical Field of the Invention

The present invention relates to a liquid crystal device board, a liquid crystal device, and an electronic apparatus, and more particularly, the present invention relates to a structure suitable for a transflective liquid crystal device.

2. Description of the Related Art

Hitherto, in known transflective liquid crystal display panels, both reflective display using external light and transmissive display using illuminating light such as backlight are made visible. Each of the transflective liquid crystal display panels has a reflective layer therein for reflecting external light and has a structure in which illuminating light such as backlight passes through the reflective layer. Some reflective layers of this type have one aperture (one slit) at each pixel of the liquid crystal display panel having a predetermined area.

FIG. 16 is a schematic sectional view schematically illustrating the schematic structure of a known transflective liquid crystal display panel 100. The liquid crystal display panel 100 has a structure in which a substrate 101 and a substrate 102 are bonded to each other with sealing adhesive 103 and liquid crystal 104 is infused between the substrates 101 and 102.

The substrate 101 has a reflective layer 111, having one aperture 111a at each pixel, formed on the inner surface thereof, and the reflective layer 111 has a color filter 112, having coloring layers 112r, 112g, and 112b and an overcoat layer 112p, formed thereon. The overcoat layer 112p on the color filter 112 has transparent electrodes 113 formed on the surface thereof.

On the other hand, the substrate 102 has transparent electrodes 121 formed on the inner surface thereof so as to intersect with the transparent electrodes 113 on the substrate 101 which faces the substrate 102. The transparent electrodes 113 above the substrate 101 and transparent electrodes 121 above the substrate 102 have an alignment film and a hard protective film formed thereon as necessary.

Also, the substrate 102 has a retardation film (¼ wave film) 105 and a polarizer 106 sequentially disposed on the outer surface thereof, and the substrate 101 has a retardation film (¼ wave film) 107 and a polarizer 108 sequentially disposed on the outer surface thereof.

When the liquid crystal display panel 100 having a structure as described above is installed in an electronic apparatus such a portable phone or a portable information terminal, the electronic apparatus has a backlight 109 behind the liquid crystal display panel 100. In the liquid crystal display panel 100, during the daytime or in a well-lighted area, e.g., in a building, reflective display is visible since external light is reflected off the reflective layer 111 after passing through the liquid crystal 104, again passes through the liquid crystal 104, and is emitted from the liquid crystal display panel 100 along a reflecting path R. On the other hand, at nighttime or in a dark area, e.g., in an open area, by illuminating the backlight 109, transmissive display is visible since, after passing through the apertures 111a, a part of illuminating light from the backlight 109 passes through the liquid crystal display panel 100 and then is emitted from the liquid crystal panel 100 along a transmitting path T.

However, in the known transflective liquid crystal display panel 100 described above, making the areas of the apertures of the reflective layer small so as to improve the brightness of the reflective display causes deteriorated brightness of the transmissive display. In particular, since transmitting light in the transmissive display passes through the liquid crystal layer only once while reflecting light visible in the reflective display passes through the liquid crystal layer twice, the transflective liquid crystal display panel 100 can not be optically constructed such that both reflected light and transmitted light are effectively used so that the two types of display mentioned above are clearly visible in the light transmissive state. For example, since the transflective liquid crystal display panel 100 is often constructed such that reflected light is effectively emitted from the liquid crystal display panel in the reflective display which is likely to become dark, the utilization efficiency of transmitted light (the ratio of the amount of light passing through and emitting from the liquid crystal display panel to the amount of light incident on the liquid crystal display panel) necessary to achieve the transmissive display is low, and thus the transmissive display becomes dark when the areas of the apertures of the reflective layer are excessively reduced as described above.

Accordingly, it is extremely difficult to construct the transflective liquid crystal display panel 100 so as to make both the reflective display and the transmissive display bright, that is, making the reflective display bright by reducing the areas of the apertures of the reflective layer requires the amount of illuminating light from the backlight to be sufficient enough so as to maintain the brightness of the transmissive display, thereby hampering the liquid crystal device to achieve a reduction in size, thickness, weight, and power consumption, which is essential to a portable electronic apparatus.

Also, since the brightness in the reflective display is in general insufficient as described above, the light transmission of the color filter 112 is required to be high so as to maintain the sufficiently bright display; however, this arrangement causes a problem in that sufficient chroma in the transmissive display obtained by light passing through the color filter only once is not achieved.

In view of the foregoing problems, one object of the present invention is to provide a liquid crystal device having a structure in which the brightness in reflective display and the brightness in transmissive display are achieved together in a higher dimension and in which the brightness in the reflective display and the chroma in the transmissive display are maintained together.

SUMMARY OF THE INVENTION

The present invention is made so as to solve the above described problems. A liquid crystal device board according to the present invention comprises at least one substrate; a reflective layer disposed on the substrate and comprising apertures; coloring layers disposed on the reflective layer; and a substantially transmissive protection layer disposed on the coloring layers and comprising apertures or thin portions. The apertures or the thin portions of the protection layer are disposed in the regions which overlap the apertures of the reflective layer, and the protection layer includes depressions on the surface thereof, the depressions being formed by the apertures or the thin portions of the protection layer.

More particularly, the liquid crystal device board according to the present invention may further comprise an alignment film disposed on the protection layer and comprising depressions on the surface thereof.

According to the present invention, since the apertures or the thin portions formed in the protection layer disposed on the coloring layers of the liquid crystal device board allow the protection layer to have depressions formed on the surface thereof, when a transflective liquid crystal device is formed with these surface depressions, portions of liquid crystal above the apertures of the reflective layer are thicker than the other portions of the liquid crystal, and, accordingly, the liquid crystal in the regions above the apertures, which are used for achieving transmissive display, is thicker than in the other regions above the reflecting surfaces of the reflective layers, which are used for achieving reflective display. With this arrangement, since a retardation of the liquid crystal acting on transmitting light necessary to achieve the transmissive display (an optical value of the liquid crystal acting on light passing through the liquid crystal layer) approaches another retardation of the liquid crystal acting on reflecting light necessary to achieve the reflective display (an optical value of the liquid crystal acting on light passing through the liquid crystal layer twice), the utilization efficiency of the transmitted light necessary to achieve the transmissive display is improved. When the utilization efficiency of the transmitted light is improved, the amount of illuminating light necessary to achieve the transmissive display can be reduced, and also the reflective display can be made brighter by reducing the areas of the apertures of the reflective layer.

In the liquid crystal device board according to the present invention, the substrate may comprise depressions on the surface thereof, and the apertures of the reflective layer may lie above the depressions. Since the apertures of the reflective layer lie above the depressions on the surface of the substrate, thick portions corresponding to the depressions can be formed in the coloring layers formed on the reflective layer, and thus the chroma of the transmissive display can be improved. Further, in this case, the coloring layers may include depressions on the surface thereof, the depression corresponding to the depressions of the substrate. Since the depressions corresponding to the depressions on the surface of the substrate are also formed on the surface of the coloring layers, the surface depressions formed by the apertures or the thin portions of the protection layer can be easily made deeper, the liquid crystal in the regions thereof, which contribute to the transmissive display, can be made thicker, and thus the utilization efficiency of the transmitted light necessary to achieve the transmissive display can be further improved.

Also, the liquid crystal device board according to the present invention may further comprise an underlying layer disposed on the substrate and including apertures or thin portions. The apertures of the reflective layer lie above the apertures or the thin portions of the underlying layer and the coloring layers are disposed on the reflective layer and include depressions on the surfaces thereof, the depressions corresponding to the apertures or the thin portions of the underlying layer. With this arrangement, the underlying layer having the apertures or the thin portions makes the surface depressions deeper, and thus the utilization efficiency of the transmitted light necessary to achieve the transmissive display can be further improved.

A liquid crystal device according to the present invention comprises a liquid crystal layer; coloring layers; at least one reflective layer comprising apertures and reflectors for reflecting light passing through the liquid crystal layer and the coloring layers; a substantially-transmissive protection layer covering the coloring layers. The protection layer includes apertures or thin portions in the regions which overlap the apertures of the reflective layer and the liquid crystal layer lies in depressions formed by the apertures or the thin portions of the protection layer.

In the liquid crystal device according to the present invention, since the liquid crystal layer lies in the depressions formed by the apertures or the thin portions of the protection layer, the liquid crystal can be made thick in the regions which overlap the apertures of the reflective layer, and thus the brightness of the transmissive display can be improved. Accordingly, the amount of illuminating light necessary to achieve the transmissive display can be reduced, and also the reflective display can be made brighter by reducing the areas of the apertures of the reflective layer.

Also, another liquid crystal device according to the present invention comprises a pair of substrates; a liquid crystal layer disposed between the pair of substrates; at least one reflective layer disposed on one of the substrates and including apertures and reflectors for reflecting light passing through the liquid crystal layer; coloring layers disposed on the reflective layer; and a substantially-transmissive protection layer covering the coloring layers and including apertures or thin portions in the regions which overlap the apertures of the reflective layer. The liquid crystal layer lies in depressions formed by the apertures or the thin portions of the protection layer.

According also to the present invention, since the liquid crystal layer lies in the depressions formed by the apertures or the thin portions of the protection layer, the liquid crystal can be made thick in the regions which overlap the apertures of the reflective layer the brightness of the transmissive display can be improved. Accordingly, the amount of illuminating light necessary to achieve the transmissive display can be reduced, and also the reflective display can be made brighter by reducing the areas; of the apertures of the reflective layer.

Furthermore, another liquid crystal device according to the present invention comprises a pair of substrates; a liquid crystal layer disposed between the pair of substrates; at least one reflective layer disposed on one of the substrates and including apertures and reflectors for reflecting light passing through the liquid crystal layer; coloring layers disposed on the other substrate; and a substantially-transmissive protection layer covering the coloring layers and including apertures or thin portions in the regions which overlap the apertures of the reflective layer. The liquid crystal layer lies in depressions formed by the apertures or the thin portions of the protection layer.

According also to the present invention, since the liquid crystal layer lies in the depressions formed by the apertures or the thin portions of the protection layer, the liquid crystal can be made thick in the regions which overlap the apertures of the reflective layer, and thus the brightness of the transmissive display can be improved. Accordingly, the amount of illuminating light necessary to achieve the transmissive display can be reduced, and also the reflective display can be made brighter by reducing the areas of the apertures of the reflective layer.

In the liquid crystal device according to the present invention, when "a" is defined as a thickness of the liquid crystal layer in the regions which overlap the reflectors of the reflective layer and "b" is defined as another thickness of the liquid crystal layer in the other regions which overlap the apertures of the reflective layer, b is preferably greater than a and equal to or less than 2a.

In the liquid crystal device according to the present invention, when the thickness b of the liquid crystal layer in the regions which overlap the apertures of the reflective layer is greater than the thickness a of the liquid crystal layer in the other regions which overlap the reflecting surfaces of the reflective layer, and equal to or less than 2a, the utilization efficiency of light necessary to achieve the transmissive display can be improved.

In the liquid crystal device according to the present invention, the liquid crystal layer may comprise nematic liquid crystal having a predetermined twist angle Tw and may satisfy the following conditions: (1) when 70<Tw≦90, a<b≦∈+ 1.0 [μm], (2) when 50<Tw≦70, a<b≦a+2.2 [μm], (3) when 30<Tw≦50, a<b≦a+3.5 [μm], and (4) when 0<Tw≦30, a<b≦a+5.0 [μm]. In general, when the twist angle Tw is equal to or less than 90 degrees, compared to the state in which the thickness b of the liquid crystal layer in the transmissive regions which overlap the apertures is equal to the thickness a of the liquid crystal layer in the reflective regions which overlap the reflecting surfaces, the light transmission can be improved in the foregoing ranges in which the thickness b of the liquid crystal layer is greater than the thickness a of the liquid crystal layer. For example, when the thickness b in the transmissive regions is optimized with respect to the light transmission for the transmissive display, the light transmission for the reflective display in the foregoing ranges can be improved. Also, when the thickness a in the reflective regions is optimized with respect to the light transmission for the reflective display, the light transmission for the transmissive display in the foregoing ranges can be improved.

Also, in the liquid crystal device according to the present invention, at least one of the pair of substrates may include depressions on the surface thereof, and the apertures of the reflective layer may lie above the depressions. In particular, since the liquid crystal device has surface depressions formed therein, in which the liquid crystal lies, corresponding to the depressions, the liquid crystal in the regions which overlap the apertures of the reflective layer can be easily made thicker.

In this case, at least one of the pair of substrates may include depressions on the surface thereof, and the apertures of the reflective layer may lie above the depressions. With this arrangement, the thick portions of the coloring layers can be easily formed and also the chroma of the transmissive display can be improved by disposing the thick portions.

In addition, in the liquid crystal device according to the present invention, at least one of the pair of substrates may comprise an underlying layer on the surface thereof, and the underlying layer may comprise apertures or substantially-transmissive thin portions in the regions which overlap the apertures of the reflective layer. In particular, since the liquid crystal device has surface depressions formed therein, in which the liquid crystal lies, corresponding to the apertures or the thin portions of the underlying layer, the liquid crystal in the regions which overlap the apertures of the reflective layer can be easily made thicker. Also, in this case, the coloring layers may comprise thick portions on the apertures or the thin portions of the underlying layer.

Furthermore, the liquid crystal device according to the present invention may further comprise a substantially transmissive light-transmitting layer disposed on the reflective layer and including apertures or thin portions in the regions which overlap the apertures of the reflective layer. In particular, since the liquid crystal device has surface depressions formed therein, in which the liquid crystal lies, corresponding to the apertures or the thin portions of the light-transmitting layer, the liquid crystal in the regions which overlap the apertures of the reflective layer can be easily made thicker. Also, in this case, the coloring layers may comprise thick portions on the apertures or the thin portions of the light-transmitting layer.

The above described liquid crystal device may further comprise an observation-side retardation film; an observation-side polarizer; a rear-side retardation film; and a rear-side polarizer, wherein the observation-side retardation film and polarizer are disposed opposite to the reflective layer with respect to the liquid crystal layer, and the rear-side retardation film and polarizer are disposed opposite to the liquid crystal layer with respect to the reflective layer.

An electronic apparatus according to the present invention comprises any one of the liquid crystal devices described above and control means for controlling the liquid crystal device. In particular, the electronic apparatus according to the present invention is preferably a portable electronic apparatus such as a portable phone or a portable information terminal.

DETAILED DESCRIPTION OF THE PREFERRED EMBODIMENTS

Referring now to the accompanying drawings, the liquid crystal device board, the liquid crystal device, and the electronic apparatus according to the present invention will be described in detail.

First, a liquid crystal device of a first embodiment of the present invention will be described with reference to FIGS. 1 and 2.

Figure 1:
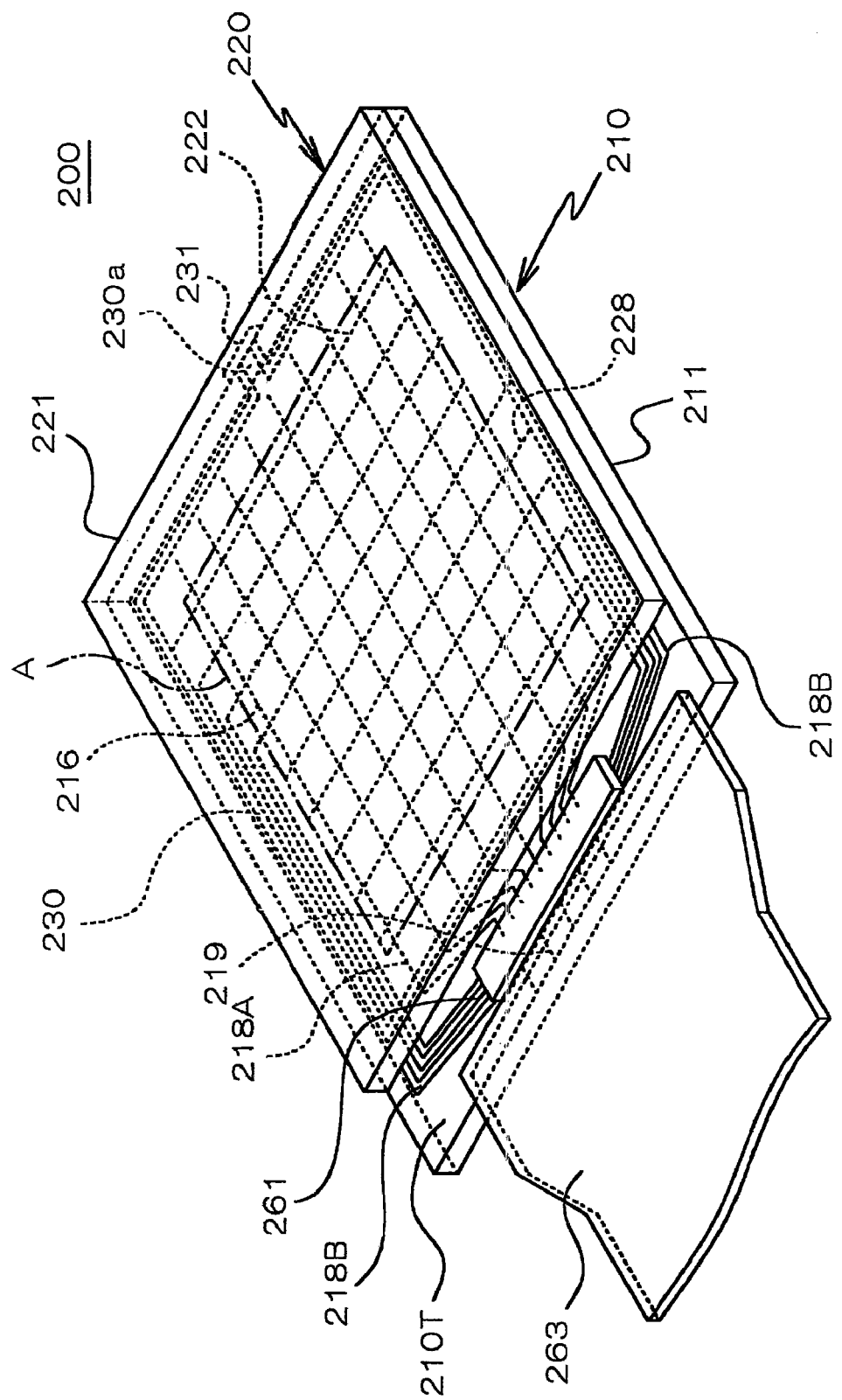
FIG. 1 is a schematic perspective view illustrating the external appearance of a liquid crystal display panel of a first embodiment of the present invention.

FIG. 1 is a schematic perspective view illustrating the external appearance of a liquid crystal display panel 200 included in a liquid crystal device of the first embodiment of the present invention. FIG. 2(a) is a schematic sectional view schematically illustrating the liquid crystal display panel 200, and FIG. 2(b) is a magnified plan view of part of a color filter substrate 210 included in the liquid crystal display panel 200.

The liquid crystal device has an illuminating device (not shown) such as a backlight or a front light, and a casing (not shown) in which the liquid crystal display panel 200 mounted having a so-called transflective-type passive matrix structure, if required.

As shown in FIG. 1, the liquid crystal display panel 200 has a cell structure in which a color filter substrate 210 having a transparent first substrate 211 as a base, which is made from a glass plate, a synthetic resin plate, or the like, and a counter substrate 220 facing the color filter substrate 210 and having a second substrate 221 as a base, which is similar to the first substrate 211, are bonded to each other with sealing adhesive 230, and liquid crystal 232 is infused inside the space formed therebetween and enclosed by the sealing adhesive 230 via an opening 230a and is sealed in the space with sealant 231.

The first substrate 211 has a plurality of strips of transparent electrodes 216 formed parallel to each other on the inner surface thereof (on the surface thereof facing the second substrate 221), and the second substrate 221 has a plurality of strips of transparent electrodes 222 formed parallel to each other on the inner surface thereof. Also, the transparent electrodes 216 are electrically connected to wiring lines 218A, and the transparent electrodes 222 are electrically connected to wiring lines 228. The transparent electrodes 216 and 222 are orthogonal to each other. A large number of pixels are configured in a matrix array in a region where these transparent electrodes intersect with each other, and these arrayed pixels constitute a liquid crystal display region A.

The first substrate 211 has a substrate overhang 210T extending outward from the external end of the second substrate 221. The wiring lines 218A, wiring lines 218B electrically connected to the wiring lines 228 via a vertical conductor as part of the sealing adhesive 230, and an input terminal unit 219 having a plurality of independently formed wiring patterns is formed on the substrate overhang 210T. Also, the substrate overhang 210T has a semiconductor IC 261 including a liquid crystal drive circuit and so forth so as to be electrically connected to these wiring lines 218A and 218B and the input terminal unit 219 mounted thereon. In addition, the substrate overhang 210T has a flexible wiring board 263 mounted at the end thereof so as to be electrically connected to the input terminal unit 219.

In the liquid crystal display panel 200, as shown in FIGS. 2(a) and 2(b), the first substrate 211 has a retardation film (¼ wave film) 240 and a polarizer 241 disposed on the outer surface thereof, and the second substrate 221 has a retardation film (¼ wave film) 250 and a polarizer 251 disposed on the outer surface thereof.

Referring now to FIGS. 2(a) and (b), the structure of the color filter substrate 210 corresponding to the liquid crystal device board according to the present invention will be described in detail. The first substrate 211 has a reflective layer 212 formed on the surface thereof. The reflective layer 212 can be formed from a metal film made from aluminum, an aluminum alloy, chromium, a chromium alloy, silver, a silver alloy, or the like. The reflective layer 212 has a reflector 212r having a reflective surface and disposed at each pixel mentioned above, and an aperture 212a disposed at each pixel.

The reflective layer 212 has coloring layers 214 formed thereon, one at each pixel, and an overcoat layer 215 made from a transparent resin such as an acrylic resin or an epoxy resin so as to cover the coloring layers 214. The color filter is configured by the coloring layers 214 and the overcoat layer 215.

T coloring layers 214 are designed to provide a predetermined color usually by dispersing a colorant such as a pigment or a dye into a transparent resin. As an example of the colors of the coloring layers, three colors, i.e., R (red), G (green), and B (blue), of three primary color filters are combined; however, the colors are not restricted to these and the coloring layers can have various colors including complimentary colors. The coloring layers having a predetermined color pattern are generally formed by applying colored resist, made from a photosensitive resin containing a colorant such as a pigment or a dye, on the surface of the substrate, and then by removing unnecessary portions by photolithography. When coloring layers having a plurality of colors are formed, the foregoing step is repeated in this stage.

The coloring layers 214, one formed at each pixel in the above described manner, have a black matrix film (or black mask film) 214BM formed in the space between adjacent pixels, i.e., between adjacent coloring layers 214. This black matrix film 214BM is formed, for example, by dispersing a colorant such as a black pigment or a black dye into a resin or other base material, or by dispersing three kinds of colorants, R (red), G (green), and B (blue), all together into a resin or other base material.

Although the coloring layers are illustrated in a stripe array in FIG. 2(b) by way of example, the coloring layers may have various array patterns such as a delta array and a mosaic array, other than the stripe array.

The overcoat layer 215 has apertures 215a, one formed at each pixel, directly above the regions facing the corresponding apertures 212a of the reflective layer 212 (i.e., the regions which two-dimensionally overlap the corresponding apertures 212a). Accordingly, the surfaces of the coloring layers 214 are exposed to the upper layer on the coloring layers 214 via the apertures 215a in this embodiment.

The overcoat layer 215 has transparent electrodes 216 made from a transparent conductor such as ITO (indium tin oxide) thereon. The transparent electrodes 216 are formed in strips extending along the vertical direction viewed in FIG. 2(b), and the plurality of transparent electrodes 216 are arranged in strips lying parallel to each other. The transparent electrodes 216 have an alignment film 217, made from a polyimide resin or the like, formed thereon.

The transparent electrodes 216 have depressions 216a formed on the surfaces of the corresponding apertures 215a formed in the overcoat layer 215. Although the depressions 216a are covered by the alignment film 217, the depression profiles thereof are followed on the surface of the color filter substrate 210, allowing the color filter substrate 210 to have surface depressions 210a, one at each pixel.

On the other hand, the counter substrate 220 facing the color filter substrate 210 is constructed such that the transparent electrodes 222 similar to the transparent electrodes 216, a hard protective film 223 made from $SiO_2$, $TiO_2$, or the like, and an alignment film 224 similar to the alignment film 217 are sequentially laminated on the second substrate 221 made from glass or the like.

Figure 3:
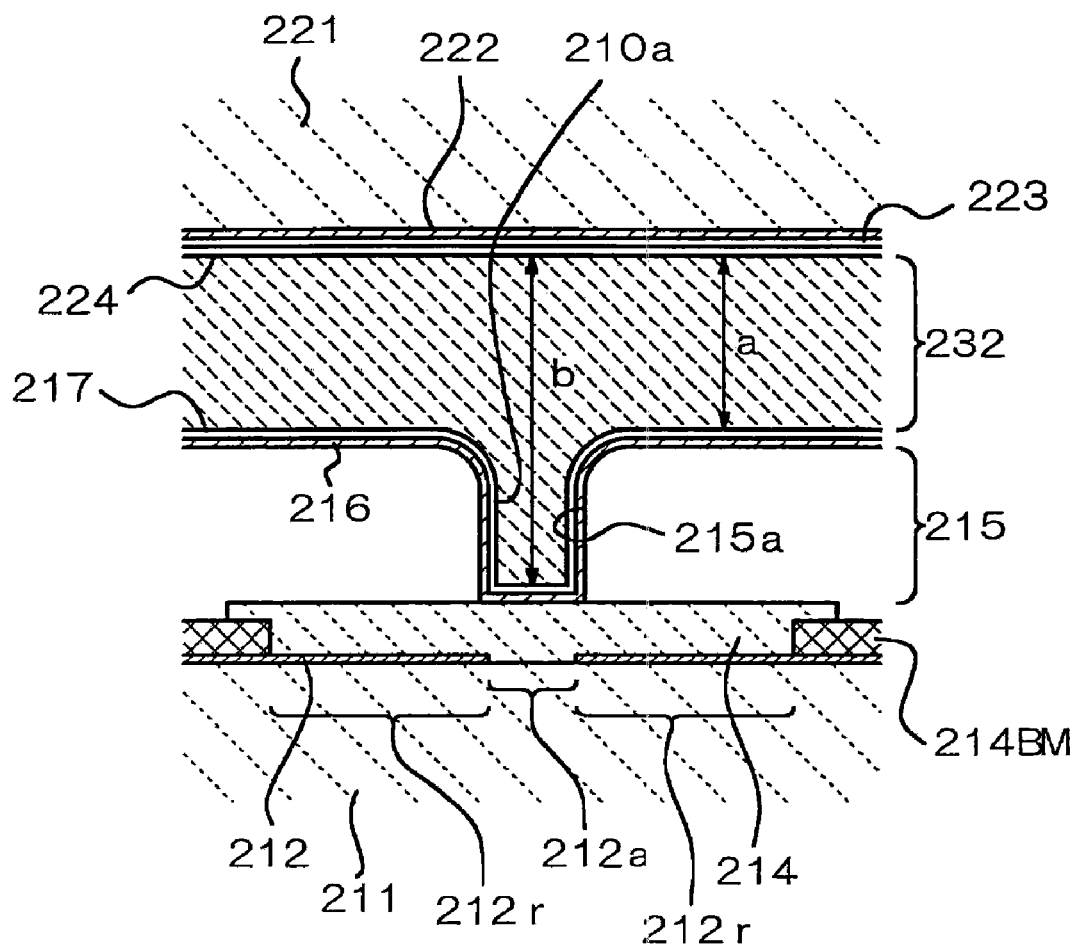
FIG. 3 is a magnified sectional view of part of an enlarged scale schematically illustrating the internal structure of a pixel of the liquid crystal display panel according to the first embodiment.

As shown in FIG. 3, the liquid crystal 232 is infused between the color filter substrate 210 and the counter substrate 220 configured in the above described manner, In this case, since one surface depressions 210a is formed at each pixel on the inner surface of the color filter substrate 210 in the above described manner, the liquid crystal 232 is configured so as to fill the surface depressions 210a (i.e., the apertures 215a of the overcoat layer 215). With this configuration, the liquid crystal layer is thicker in the regions where the apertures 215a of the overcoat layer 215 are formed (that is, in the regions where the apertures 212a of the reflective layer 212 are formed) than in other regions (that is, in the regions where the reflectors 212r are formed).

In this embodiment which is configured in the above described manner, external light incident from the counter substrate 220 side passes through the liquid crystal 232 and the color filter, is then reflected off the reflectors 212r, again passes through the liquid crystal 232 and the counter substrate 220, and exits the liquid crystal panel 200. In this case, the incoming light passes through the coloring layers 214 of the color filter twice.

On the other hand, since the coloring layers 214 cover the apertures 212a of the reflective layer 212, when a backlight or the like is disposed behind the color filter substrate 210, for example, and illuminating light is radiated behind the color filter substrate 210, a part of the illuminating light passes through the apertures 212a of the reflective layer 212, passes through the coloring layers 214, passes through the liquid crystal 232 and the counter substrate 220, and exits the liquid crystal panel 200. In this case, the transmitting light passes through the coloring layers 214 only once.

In this embodiment, since the overcoat layer 215 of the color filter, formed on the first substrate 211, has the apertures 215a formed in the regions which overlap the corresponding apertures 212a of the reflective layer 212, the color filter substrate 210 is provided with the surface depressions 210a, and also, since the liquid crystal 232 fills the surface depressions 210a and accordingly the liquid crystal layer is thick in the regions which overlap the apertures 212a of the reflective layer, a retardation ($=\Delta n \times d$: where, $\Delta n$ is the refractive index anisotropy and d is the thickness) of the liquid crystal layer acting on transmitting light forming the transmissive display increases, and as a result, the utilization efficiency of the transmitted light used for the transmissive display is improved.

Figure 12:
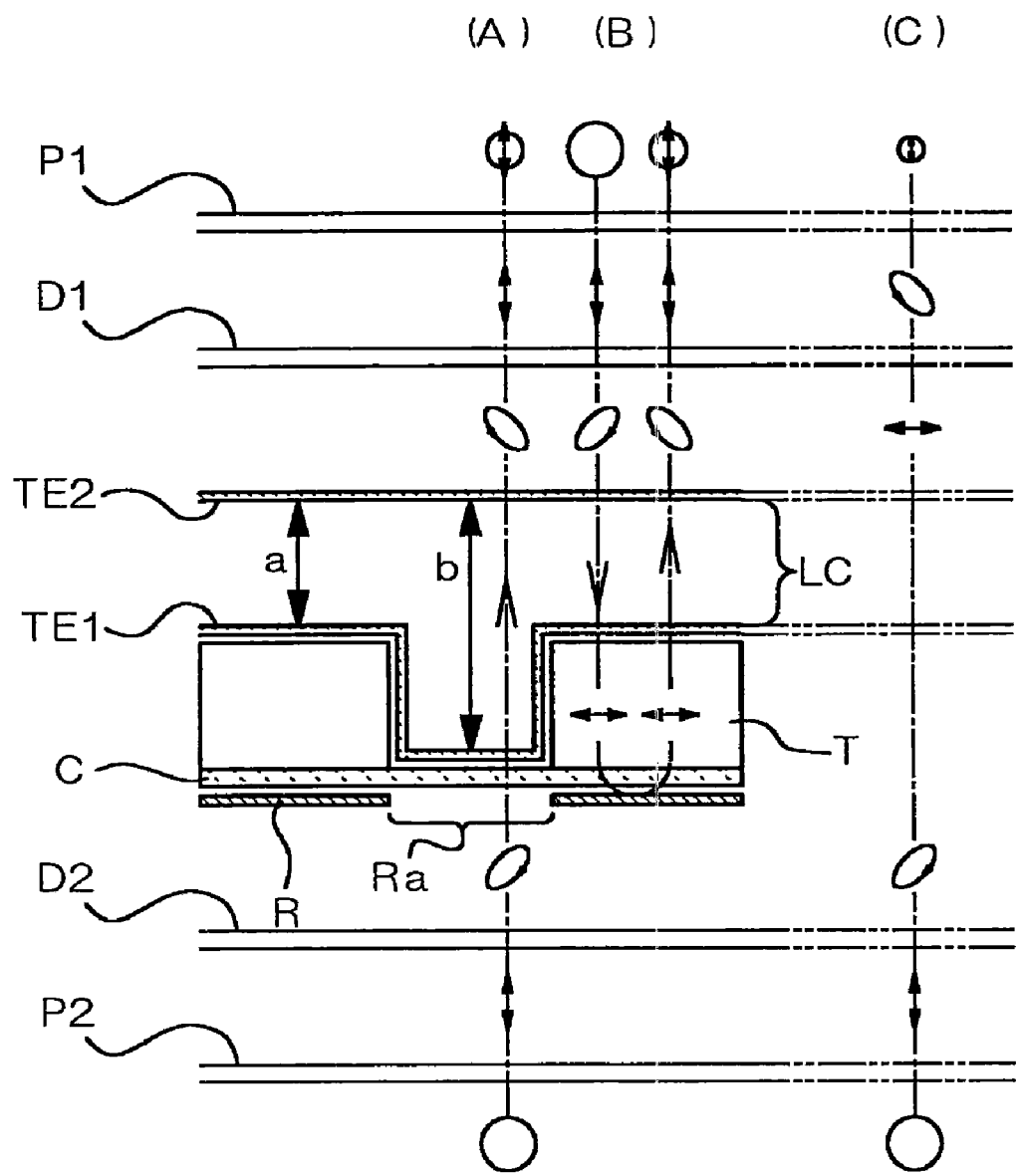
FIG. 12 is a schematic view illustrating the display principle of the liquid crystal device of the present invention.

FIG. 12 is a schematic view illustrating the effect of the thickness of the liquid crystal by changing it in the above described manner. It is assumed that, by forming a coloring layer C on a reflective layer R having an aperture Ra therein, by forming a light-transmitting layer T on the coloring layer C, and by providing the light-transmitting layer T with an aperture above the aperture Ra of the reflective layer R in the above described manner, the thickness b of the liquid crystal is about twice as large in the region which overlaps the aperture Ra as the thickness a of the liquid crystal in the other region. Also, for convenience of explanation, it is assumed that a homogenous liquid crystal cell is constructed and that retardations of this liquid crystal cell are given by $\Delta n \times a = \lambda/4$ and $\Delta n \times b = \lambda/2$ (where, $\Delta n$ is the refractive index anisotropy of the liquid crystal and $\lambda$ is wavelength of light).

In the above described situation, when the liquid crystal cell is in a light transmissive state, as illustrated by (a) in FIG. 12 for transmissive display, illuminating light from a backlight or the like is converted to linearly polarized light after passing through a polarizer P2, then is converted to, for example, right-hand circularly polarized light passing through a retardation film (¼ wave film) D2, subsequently is converted to left-hand circularly polarized light since the phase of the light further advances by a ½ wavelength after passing through the liquid crystal layer having a cell thickness D2, subsequently returns to the original linearly polarized light after passing through a retardation film D1, and then passes through a polarizer P1.

Also, when the liquid crystal cell is in a light transmissive state, as in the above described manner, as illustrated by (b) in FIG. 12 for reflective display, external light is converted to linearly polarized light after passing through the polarizer P1, then is converted to, for example, right-hand circularly polarized light after passing through the retardation film (¼ wave film) D1, subsequently is converted to left-hand circularly polarized light since the phase further advances by ½ wavelength after passing through the liquid crystal layer having a cell thickness D1 twice in both directions, subsequently returns to the original linearly polarized light after passing through the retardation film D1 again, and then passes through the polarizer P1.

In the foregoing transmissive display, when it is assumed that the thickness of the liquid crystal through which light passes is tentatively set to "a" (which is half the liquid crystal thickness "b" illustrated by (a) in FIG. 12), since its retardation is $\lambda/4$, as illustrated by (c) in FIG. 12, illuminating light is converted to linearly polarized light orthogonal to the original light after passing through the polarizer P2, the retardation film D2, and the liquid crystal, then is converted to left-hand circularly polarized light after passing through the retardation film D1, and then passes through the polarizer P1. In this case, the quantity of the polarized component of the illuminating light passing through the polarizer P1 is substantially half that passing through the polarizer P1 when the thickness of the liquid crystal is b.

As described above, in the case of the transflective liquid crystal display panel according to this embodiment, when the liquid crystal thickness b in the regions which two-dimensionally overlap the apertures of the reflective layer is thicker than the liquid crystal thickness a in the other regions, the light transmission in a light transmissive state increases. In particular, when the liquid crystal thickness b in the regions which two-dimensionally overlap the apertures becomes substantially twice the liquid crystal thickness a in the other regions, the quantity of transmitting light becomes substantially double.

When the liquid crystal cell is not of a homogeneous type and the liquid crystal layer has a twist angle, the light transmission sometimes does not increase; however, for example, in a liquid crystal having a 40-degree twist angle, when the liquid crystal thickness in the regions which two-dimensionally overlap the apertures is set to be twice that in the other region, the light transmission increases by about 40%. In general, the liquid crystal thickness b in the regions which overlap the apertures of the reflective layer is preferably greater than the liquid crystal thickness a above the reflective surface and equal to or less than 2a. With this arrangement, since the utilization efficiency of transmitted light necessary to achieve the transmissive display increases, and thus the transmissive display becomes bright, for example, the amount of illuminating light from the backlight can be reduced, thus achieving a small, thin, light backlight which consumes less electric power. Also, the opening area of the reflective layer can be reduced more than is possible today, thereby improving the brightness of the reflective display.

Also, when the liquid crystal layer formed from nematic liquid crystal has a twist angle Tw, since the relationship between the liquid crystal thickness a in the reflective regions and the liquid crystal thickness b in the transmissive regions is determined depending on the effects of optical rotation caused by twisted liquid crystal molecules and of birefringence proportional to the thickness of the liquid crystal layer, the optimal range varies according to the twist angle Tw in the foregoing range of $a<b \leqq 2a$. More particularly, the light transmission increases in the following ranges by making the liquid crystal thickness b greater than the liquid crystal thickness a:

when $70<Tw \leqq 90$, $a<b \leqq a+1.0$ [μm], (2) when $50<Tw \leqq 70$, $a<b \leqq a+2.2$ [μm], (3) when $30<Tw \leqq 50$, $a<b \leqq a+3.5$ [μm], and (4) when $0<Tw \leqq 30$, $a<b \leqq a+5.0$ [μm].

Figure 20:
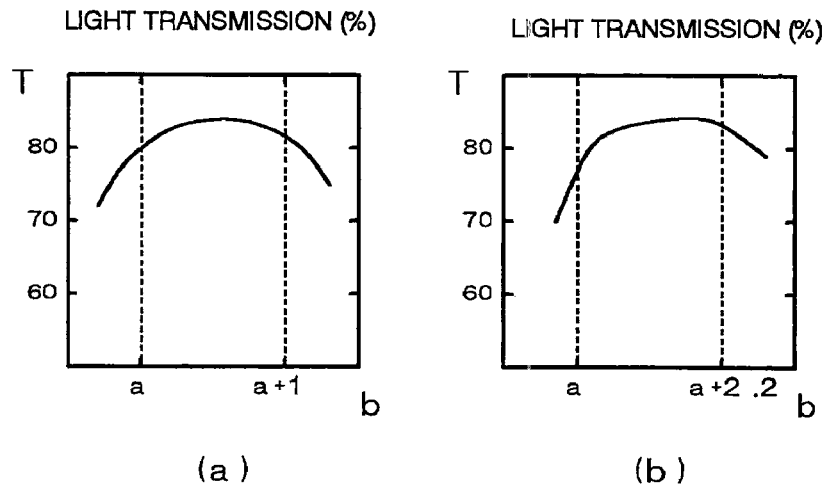
FIG. 20 includes FIGS. 20(a) to 20(d) illustrating diagrams of the relationships between liquid crystal thicknesses b of the transmitting region and transmittances of the transmitting region in a transmitting state according to a range of twist angles Tw of a liquid crystal layer, and also includes FIG. 20(e) illustrating a diagram of the relationship between the twist angle Tw and the liquid crystal thickness b for achieving the maximum transmittance of the transmitting region.
Figure 20:
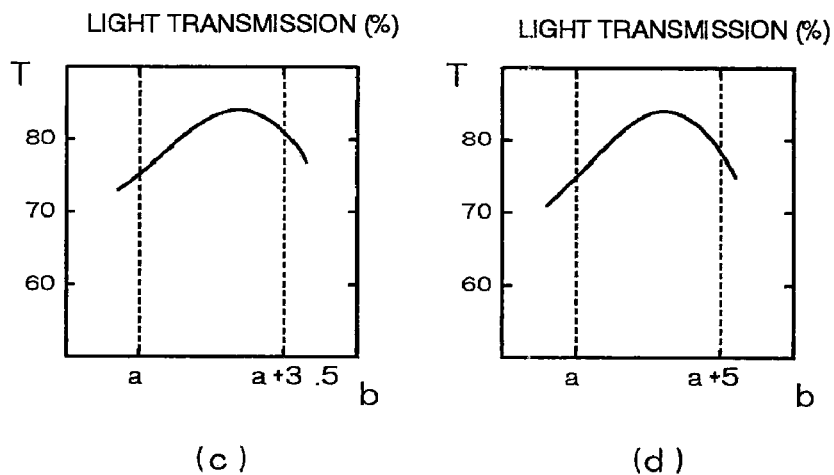
Figure 20:
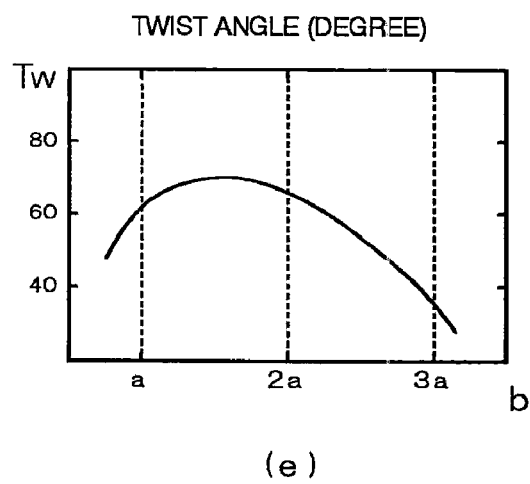

With respect to the foregoing cases (1) to (4), FIGS. 20(*a*) to 20(*d*) illustrate the light transmission in the transmissive regions when the liquid crystal display panel is in a transmissive state (e.g., in a state in which an electric field is not applied in a normally white panel) by changing the liquid crystal thickness b in the transmissive regions while optimizing the liquid crystal thickness a in the reflective regions. As can be seen from these diagrams, in any of the foregoing cases (1) to (4), when the liquid crystal thickness b is made smaller so as to approach the liquid crystal thickness a, the light transmission decreases dramatically, and when the liquid crystal thickness b exceeds a value which is much greater than the liquid crystal thickness a, the light transmission also decreases dramatically. As the twist angle Tw increases, the value which determines the upper limit of the foregoing light transmission becomes smaller in the range from 1.0 to 5.0 μm. It is believed that, since the optical rotation of the liquid crystal layer affects the light passing through the liquid crystal layer more dramatically as the twist angle Tw becomes larger, the liquid crystal does not act on the light in proportion to the thickness thereof. That is to say, it is believed that as the twist angle Tw becomes larger, the effect of making the liquid crystal thickness b greater than the liquid crystal thickness a generally decreases.

FIG. 20(*e*) is a diagram illustrating the relationship between the twist angle Tw at which the light transmission in the transmissive regions takes the maximum value and the liquid crystal thickness b. As can be seen from this diagram, the twist angle Tw which provides the maximum light transmission in the transmissive regions increases gradually as the liquid crystal thickness b increases from a to about 1.8a, and when b exceeds about 1.8a, the twist angle Tw which provides the maximum light transmission dramatically decreases. In this case, the light transmission is high when the twist angle Tw takes a value in the range of $50 \leqq Tw \leqq 70$ when b lies in the range of $a<b \leqq 2a$.

Figure 2:
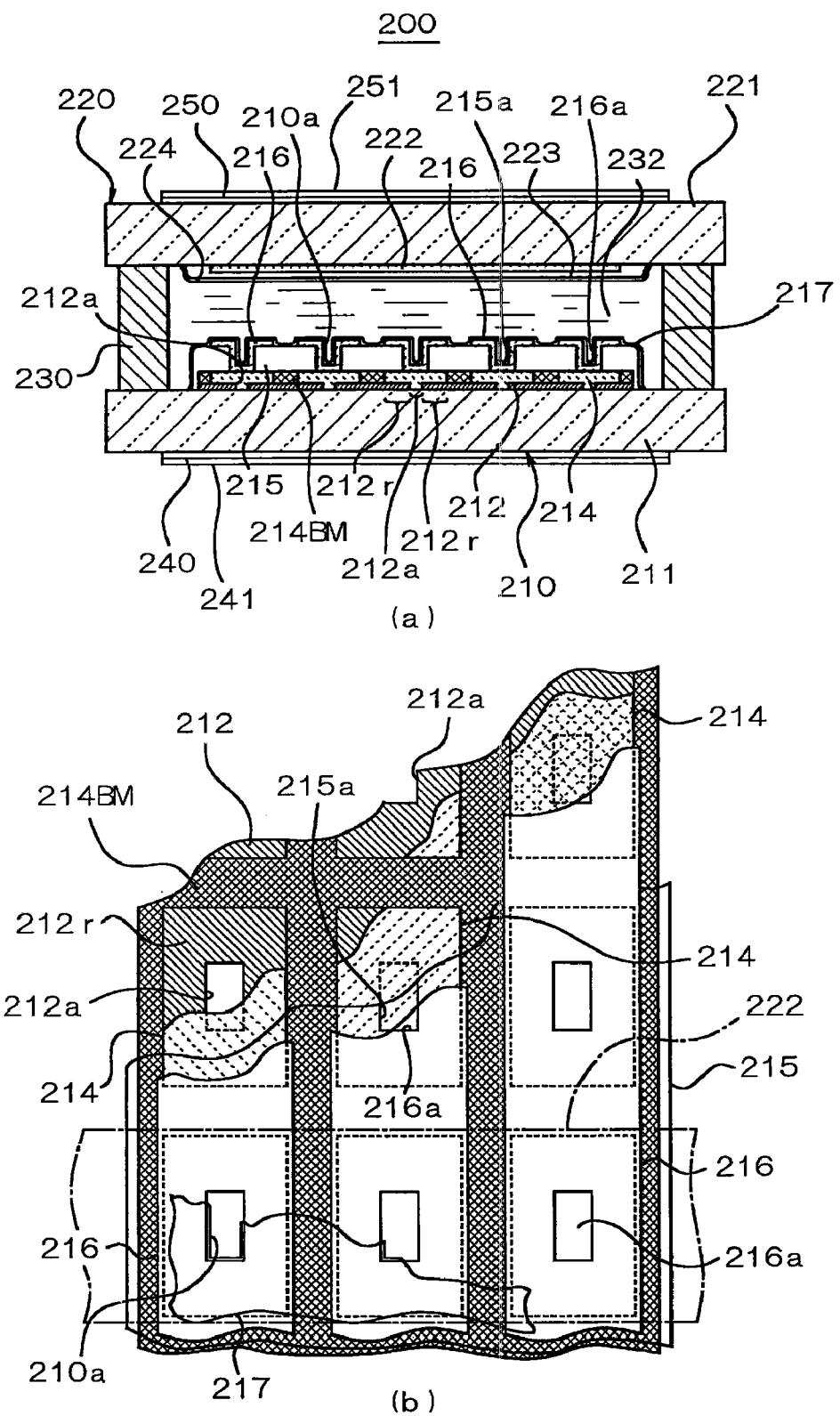
FIG. 2 includes a schematic sectional view FIG. 2(a) schematically illustrating the structure of the liquid crystal display panel of the first embodiment, and a magnified plan view FIG. 2(b) illustrating the plane structure of a color filter substrate of the panel.

In this embodiment, although the apertures 125*a* are formed so as to overlap the corresponding apertures 212*a* of the reflective layer 212, as shown in FIG. 2(*b*), the coloring layers 214 can be sufficiently protected by the transparent electrodes 216 since the coloring layers 214 are fully covered by the transparent electrodes 216.

Since the thickness of the overcoat layer 215 in the liquid crystal display panel is generally about 3 to 5 μm, the overcoat layer 215 is quite thick compared to the transparent electrodes 216 having a thickness of about 1500 to 3000 Å. Accordingly, the method of making the liquid crystal thick by providing the protection layer with apertures or thin portions is quite effective. Although not described in the above described embodiment, an insulating film made from $SiO_2$, $TiO_2$, or the like may be formed between the overcoat layer 215 (i.e., a protection layer) and the transparent electrodes 216 so as to improve the adhesiveness and the pattern features of the transparent electrodes 216.

Figure 4:
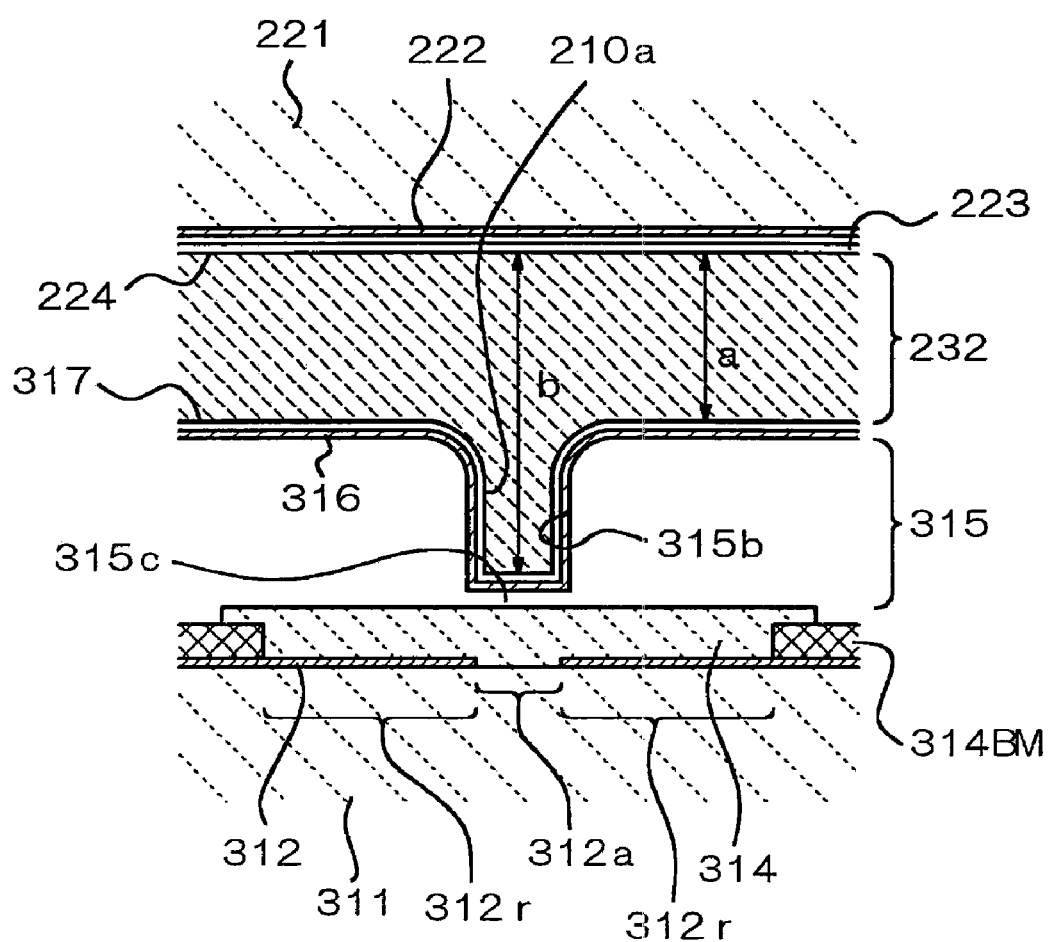
FIG. 4 is a schematic sectional view schematically illustrating the internal structure of a pixel of a liquid crystal device of a second embodiment of the present invention.

Referring now to FIG. 4, a second embodiment of the present invention will be described. Since the second embodiment has the same configuration as the first embodiment except for the structure of the color filter substrate, which will be described later, like parts are denoted by the same reference numerals and their description is omitted.

As shown in FIG. 4, in this embodiment, as in the first embodiment, a first substrate 311 has a reflective layer 312, having reflectors 312*r* and apertures 312*a* therein, formed therein, the reflective layer 312 has coloring layers 314 formed thereon, and the coloring layers 314 have an overcoat layer 315 formed thereon. Although the overcoat layer 315 is made from the same material as the overcoat layer 215 in the first embodiment, the overcoat layer 315 has depressions 315*b* formed in the regions which overlap the corresponding apertures 312*a* of the reflective layer 312, and also has thin portions 315*c* below the depressions 315*b*, thus giving rise to a difference compared to the overcoat layer of the first embodiment, which has apertures formed in the spaces corresponding to the thin portions 315*c*. The overcoat layer 315 has transparent electrodes 316 and an alignment film 317 formed thereon, as in the first embodiment.

In this embodiment, although the thin portions 315*c* lie in the regions which overlap the corresponding apertures 312*a* of the reflective layer 312, since the overcoat layer 315 is basically transparent, the same optical effects as in the first embodiment can be obtained. Also, in this embodiment, since the coloring layers 314 are covered by the overcoat layer 315 even in the regions which overlap the apertures 312*a*, the coloring layers 314 can be reliably protected.

Figure 5:
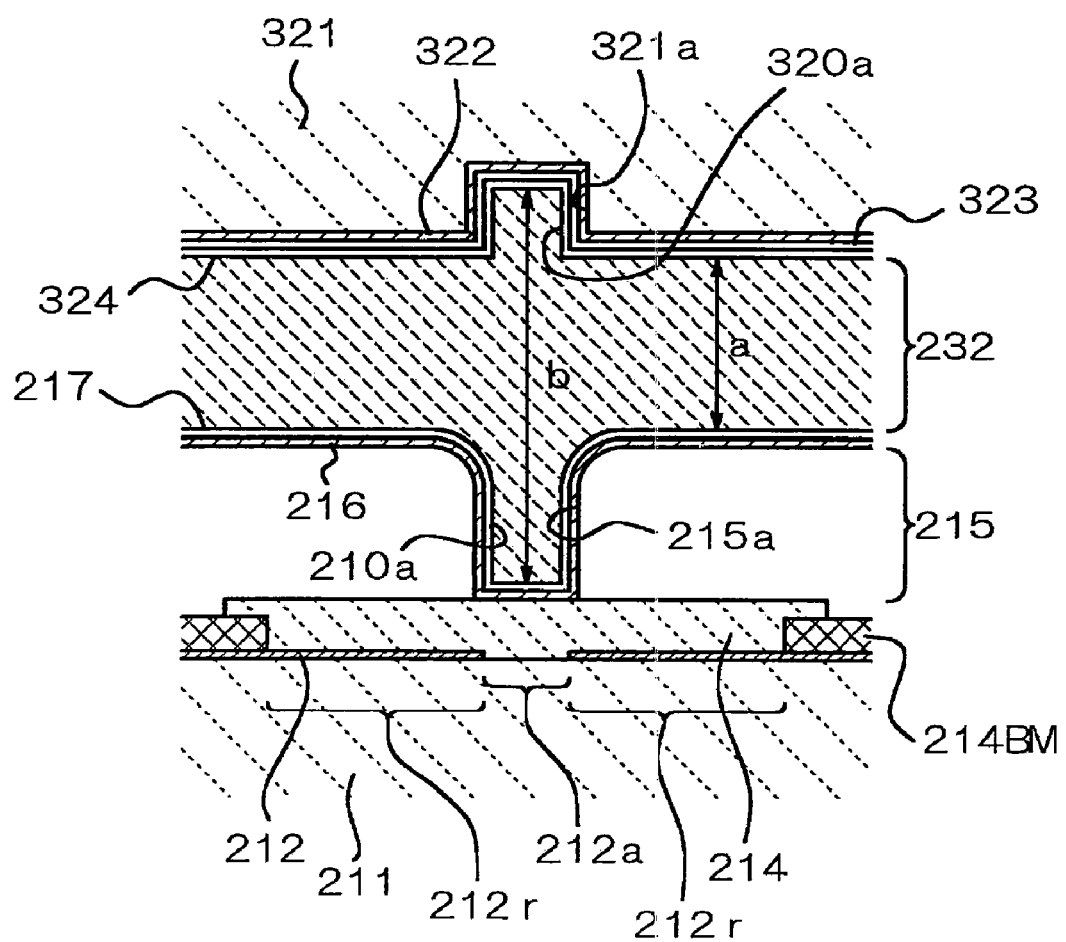
FIG. 5 is a schematic sectional view schematically illustrating the internal structure of a pixel of a liquid crystal device of a third embodiment of the present invention.

Referring now to FIG. 5, a third embodiment of the present invention will be described. Since the third embodiment has the same configuration as the first embodiment except for the structure of the counter substrate, like parts are denoted by the same reference numerals and their description is omitted.

In this embodiment, the counter substrate is constructed such that a second substrate 321 has depressions 321*a* formed on the inner surface thereof (i.e., on the surface thereof facing the first substrate 211). The depressions 321*a* can be easily formed by photolithography and etching with hydrofluoric-acid-based etching liquid. Then, the second substrate 321 has transparent electrodes 322, a hard protection film 323, and an alignment film 324 laminated on the surface thereof having the depressions 321*a* thereon.

In this embodiment, not only does the color filter substrate have the surface depressions 210*a* formed on the inner surface thereof, but also the counter substrate has surface depressions 320*a* on the inner surface thereof which faces the corresponding surface depressions 210*a*, and the liquid crystal 232 fills both the surface depressions 210*a* and 320*a*, thereby making the liquid crystal layer even thicker in the regions which overlap the apertures 212*a* of the reflective layer 212.

Figure 6:
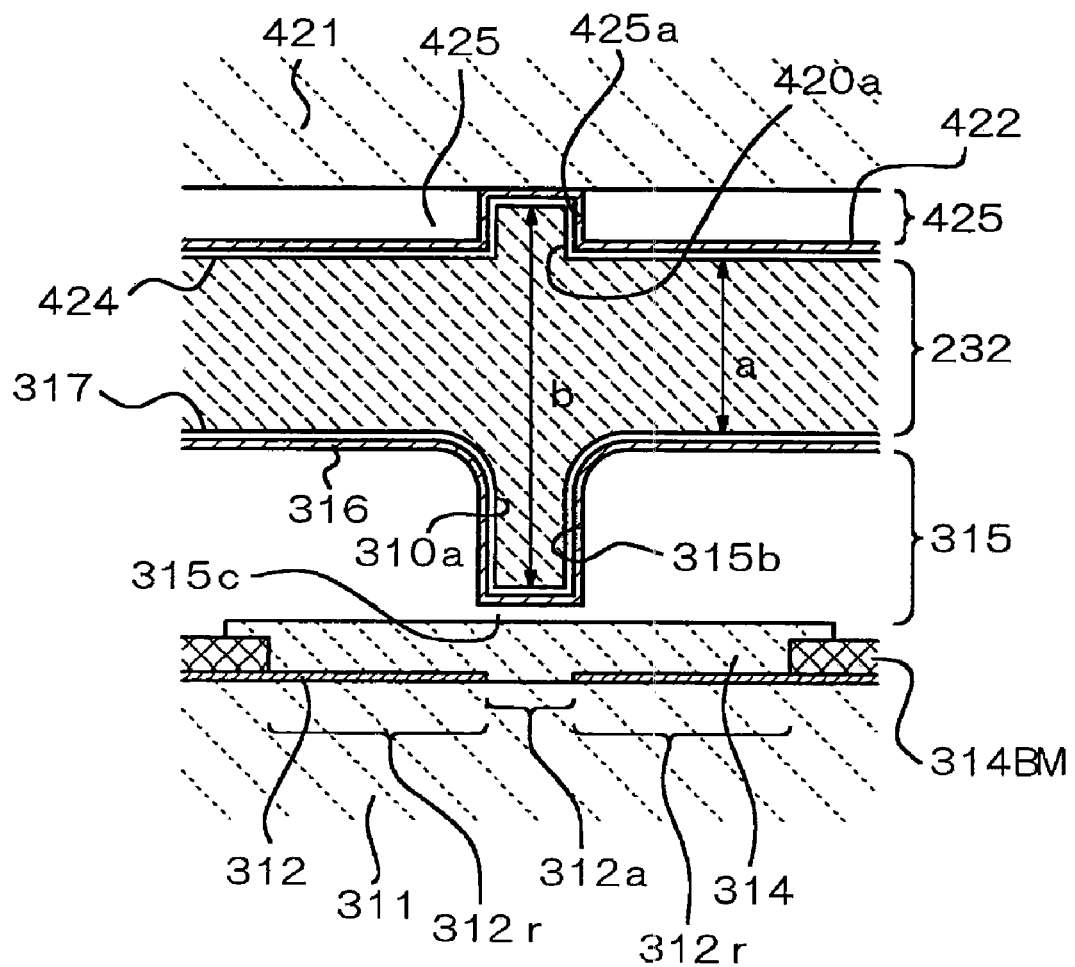
FIG. 6 is a schematic sectional view schematically illustrating the internal structure of a pixel of a liquid crystal device of a fourth embodiment of the present invention.

Referring now to FIG. 6, a fourth embodiment of the present invention will be described. Since the fourth embodiment has the same configuration as the second embodiment except for the structure of the counter substrate, like parts are denoted by the same reference numerals and their description is omitted.

The counter substrate in this embodiment has a light-transmitting layer 425 on a second substrate 421, and the light-transmitting layer 425 has apertures 425a in the regions which two-dimensionally overlap the corresponding apertures 312a of the reflective layer 312. The light-transmitting layer 425 is formed from, for example, an inorganic transparent layer made from $SiO_2$ or $TiO_2$, or an organic resin layer made from an acrylic resin or an epoxy resin. Preferably, the light-transmitting layer is substantially transparent to visible light. For example, the light-transmitting layer preferably has a light transmission of about 70% or higher in the visible light region, and the range of fluctuation of the light transmission over the visible light region is preferably equal to 10% or less.

The light-transmitting layer 425 has transparent electrodes 422 and an alignment film 424 laminated thereon. The counter substrate has surface depressions 420a, reflecting the surface profile of the apertures 425a, formed on the inner surface thereof, and the liquid crystal 232 fills the surface depressions 420a. Also, in this embodiment, since the color filter substrate and the counter substrate have the surface depressions 310a and 420a, respectively, on the respective inner surfaces thereof, it is easy to make the liquid crystal thickness b in the regions which two-dimensionally overlap the apertures 312a of the reflective layer 312 greater than the liquid crystal thickness a in the other regions above the reflective surfaces.

Figure 7:
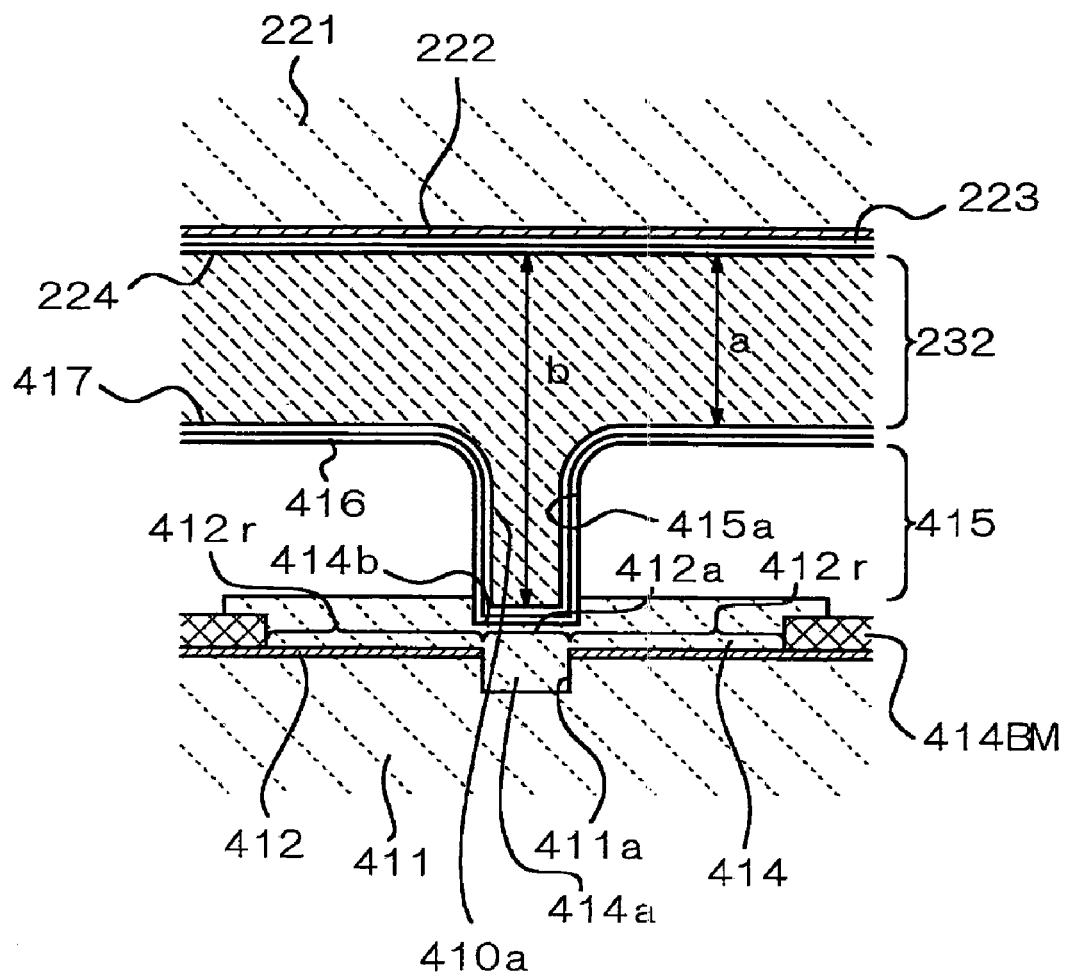
FIG. 7 is a schematic sectional view schematically illustrating the internal structure of a pixel of a liquid crystal device of a fifth embodiment of the present invention.

Referring now to FIG. 7, a fifth embodiment of the present invention will be described. Since the fifth embodiment has the same configuration as the first embodiment except for the structure of the color filter substrate, like parts are denoted by the same reference numerals and their description is omitted.

In this embodiment, a first substrate 411 has depressions 411a and also a reflective layer 412 on the surface thereof. The reflective layer 412 has reflectors 412r having reflective surfaces and apertures 412a. The reflective layer 412 is configured such that the apertures 412a lie above the corresponding depressions 411a. The reflective layer 412 has coloring layers 414 formed thereon, and further has an overcoat layer 415 formed on the coloring layers 414.

The coloring layers 414 in this embodiment are formed so as to extend into the corresponding depressions 411a of the first substrate 411 via the apertures 412a of the reflective layer 412, and thus the coloring layers 414 have thick portions 414a formed in the regions which overlap the corresponding apertures 412a. Also, the thick portions 414a have depressions 414b formed on the respective surfaces thereof so as to correspond to the respective depressions 411a.

The overcoat layer 415 has apertures 415a, which are formed therein as in the above described manner, transparent electrodes 416, and an alignment film 417 sequentially laminated on the surface thereof. As a result, the depressions 414b of the coloring layers 414 cause surface depressions 410a formed on the surface of the color filter substrate to be deeper than the counterparts in the first embodiment.

Since each depression 411a of the first substrate 411 allows the corresponding coloring layer 414 to have the thick portion 414a in the region which overlaps the corresponding aperture 412a of the reflective layer 412, the chroma of the transmissive display can be improved without sacrificing the brightness of the reflective display.

Figure 8:
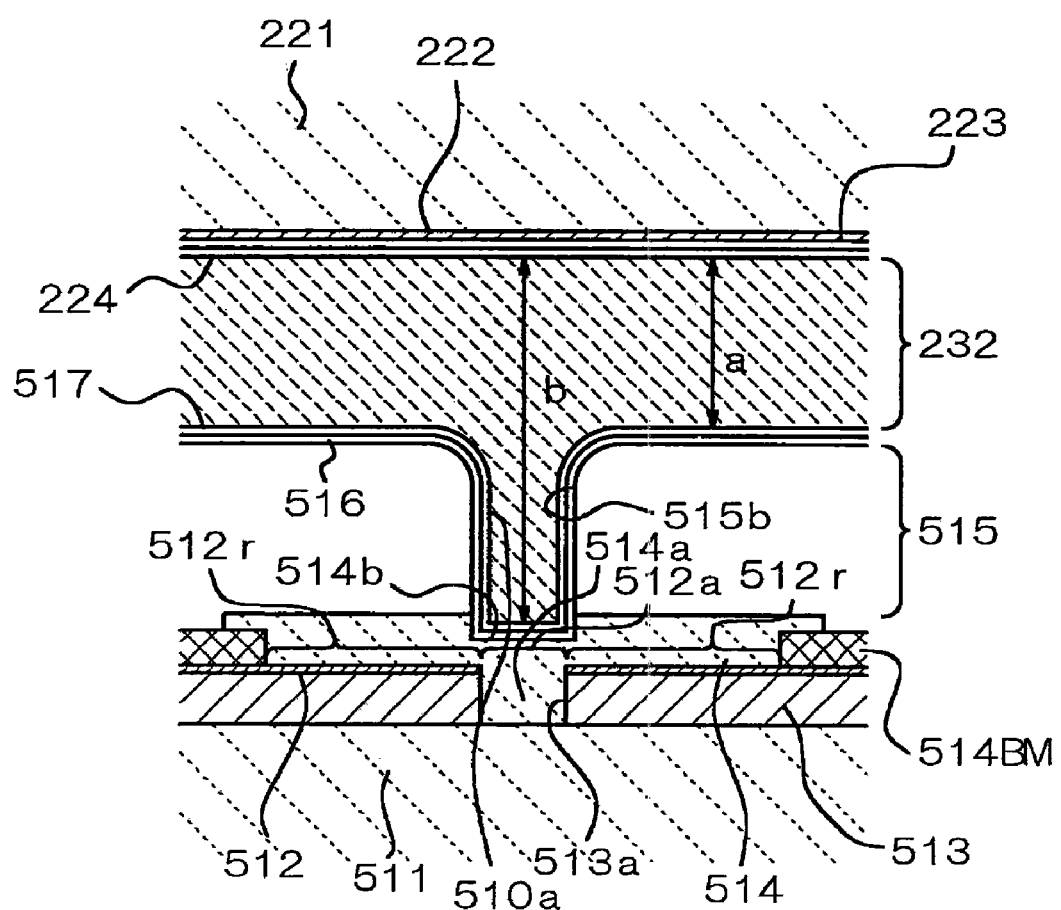
FIG. 8 is a schematic sectional view schematically illustrating the internal structure of a pixel of a liquid crystal device of a sixth embodiment of the present invention.

Referring now to FIG. 8, a sixth embodiment of the present invention will be described. Since the sixth embodiment has the same configuration as the first embodiment except for the structure of the color filter substrate, like parts are denoted by the same reference numerals and their description is omitted.

In this embodiment, a first substrate 511 has an underlying layer 513 formed thereon, and the underlying layer 513 has apertures 513a therein. Although the underlying layer 513 can be made from the same material as the light-transmitting layer of the fourth embodiment, it may be formed from a non-light-transmitting material. When the underlying layer 513 has a light-transmitting property, the underlying layer 513 may have thin portions formed therein, instead of the apertures 513a, which provide depressions on the upper surface thereof.

The underlying layer 513 has a reflective layer 512 formed thereon, and the reflective layer 512 has reflectors 512r having reflective surfaces and apertures 512a lying above the apertures 513a of the underlying layer 513. Furthermore, the reflective layer 512 has coloring layers 514 formed thereon, and the coloring layers 514 have an overcoat layer 515 formed thereon. The overcoat layer 515 has apertures 515a in the regions which overlap the corresponding apertures 512a of the reflective layer 512, and further has transparent electrodes 516 and an alignment film 517 sequentially formed thereon.

In this embodiment, as in the above described embodiments, while the apertures 515a of the overcoat layer 515 form surface depressions 510a on the surface of the color filter substrate, the apertures 513a of the underlying layer 513 form depressions 514b on the surface of the coloring layers 514 so as to overlap the corresponding apertures 512a of the reflective layer 512, thus causing the surface depressions 510a to be deeper than the counterparts in the first embodiment.

Since the apertures 513a of the underlying layer 513 allow the coloring layers 514 to have thick portions 514a in the regions which overlap the apertures 512a of the reflective layer 512, the chroma of the transmissive display can be improved without sacrificing the brightness of the reflective display.

Figure 9:
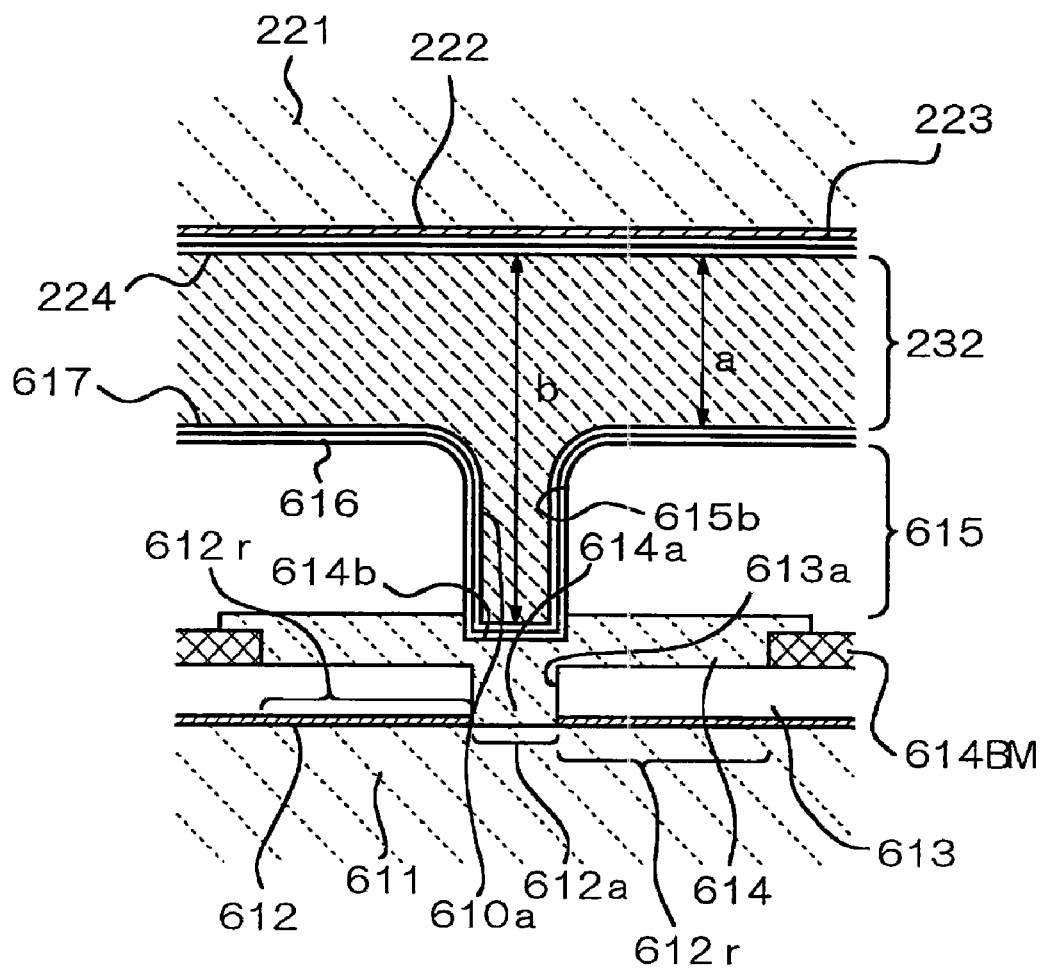
FIG. 9 is a schematic sectional view schematically illustrating the internal structure of a pixel of a liquid crystal device of a seventh embodiment of the present invention.

Referring now to FIG. 9, a seventh embodiment of the present invention will be described. Since the seventh embodiment has the same configuration as the first embodiment except for the structure of the color filter substrate, like parts are denoted by the same reference numerals and their description is omitted.

In this embodiment, a first substrate 611 has a reflective layer 612 formed thereon, the reflective layer 612 has reflectors 612r having reflective surfaces and apertures 612a formed therein. The reflective layer 612 has a light-transmitting layer 613 formed thereon. The light-transmitting layer 613 can be made from the same material as the light-transmitting layer in the fourth embodiment. The light-transmitting layer 613 has apertures 613a formed in the regions which overlap the corresponding apertures 612a of reflective layer 612.

The light-transmitting layer 613 has coloring layers 614 formed thereon, and the coloring layers 614 have an overcoat layer 615 formed thereon. The overcoat layer 615 has apertures 615a formed therein, as in the above described embodiments. The apertures 615a lie so as to two-dimensionally overlap the corresponding apertures 612a and 613a of the reflective layer 612 and the light-transmitting layer 613, respectively. The overcoat layer 615 has transparent electrodes 616 and an alignment film 617 sequentially laminated thereon.

With the above described structure, the color filter substrate has surface depressions 610a formed thereon, and thus the surface depressions 610a cause portions of the liquid crystal facing the corresponding apertures 612a of the reflective layer 612 to be thicker than the remaining portions.

In this embodiment, as in the above described embodiments, while the apertures 615a of the overcoat layer 615 form the corresponding surface depressions 610a on the color filter substrate, the apertures 613a of the light-transmitting layer 613 form depressions 614b on the surface of coloring layers 614 so as to overlap the corresponding apertures of the reflective layer 612, thereby causing the surface depressions 610a to be deeper than the counterparts in the first embodiment.

Also, since the apertures 613a of the light-transmitting layer 613 allow the coloring layers 614 to have thick portions 614a in the regions which overlap the apertures 612a of the reflective layer 612, the chroma of the transmissive display can be improved without sacrificing the brightness of the reflective display.

Figure 10:
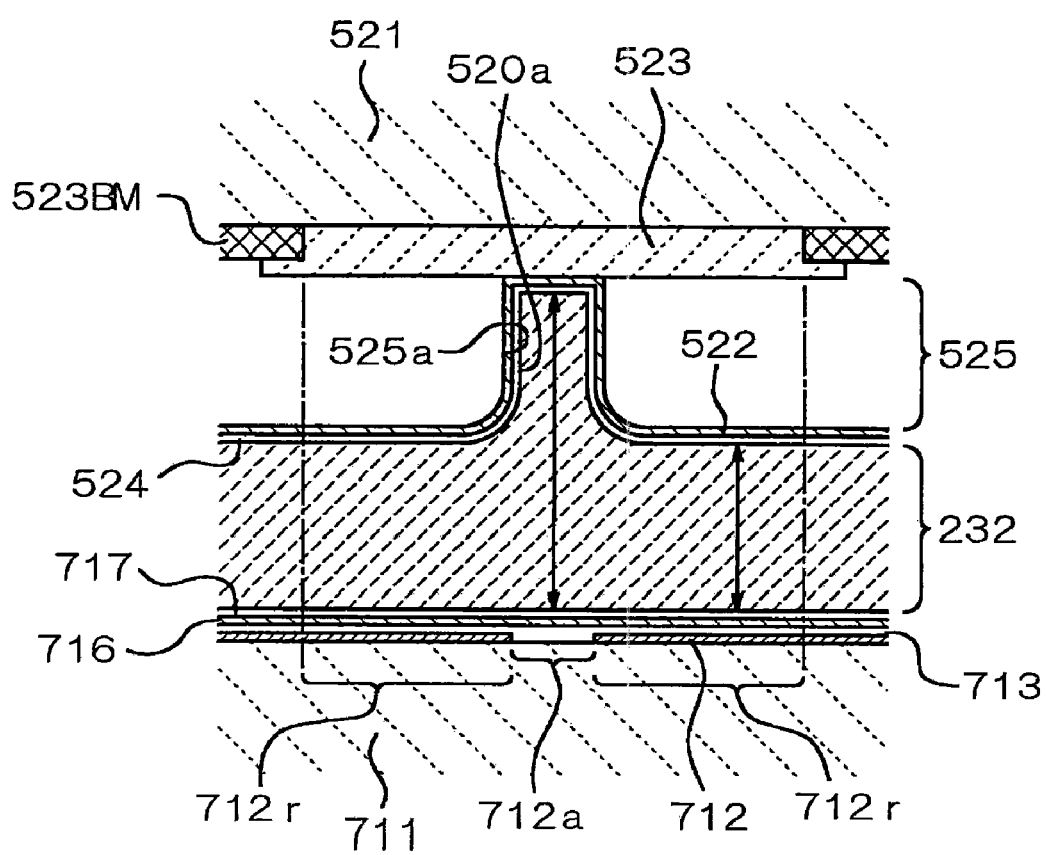
FIG. 10 is a schematic sectional view schematically illustrating the internal structure of a pixel of a liquid crystal device of an eighth embodiment of the present invention.

Referring now to FIG. 10, an eighth embodiment of the present invention will be described. In this embodiment, a first substrate 711 has a reflective layer 712 formed thereon, and the reflective layer 712 has reflectors 712r having reflective surfaces and apertures 712a disposed therein. The reflective layer 712 has an insulating film 713 made from $SiO_2$ or $TiO_2$ formed thereon, and the insulating film 713 has transparent electrodes 716 formed thereon. The transparent electrodes 716 has an alignment film 717 formed thereon. When the reflective layer 712 is separately formed at each pixel, the transparent electrodes 716 may be formed directly on the reflective layers 712 without having the insulating film 713 interposed therebetween.

On the other hand, a second substrate 521 has coloring layers 523 formed thereon, and a black matrix film 523BM is formed in the space between adjacent pixels. The coloring layer 523 has an overcoat layer 525 formed thereon, and the overcoat layer 525 has apertures 525a disposed therein. The apertures 525a are arranged so as to two-dimensionally overlap the apertures 712a of the reflective layer 712 on the first substrate 711. The overcoat layer 525 has transparent electrodes 522 formed thereon, and further has an alignment film 524 formed on the transparent electrodes 522.

In this embodiment, the second substrate 521, which is opposite to the first substrate 711 having the reflective layer 712 formed thereon, has the coloring layers 523 of the color filter formed thereon, and further has the overcoat layer 525 formed on the coloring layers 523. The apertures 525a of the overcoat layer 525 form surface depressions 520a. Also, in this embodiment, since the liquid crystal is thicker in the regions which overlap the apertures 712a of the reflective layer 712 than in the remaining regions, the same basic effects as in the above described embodiments can be obtained.

Figure 15:
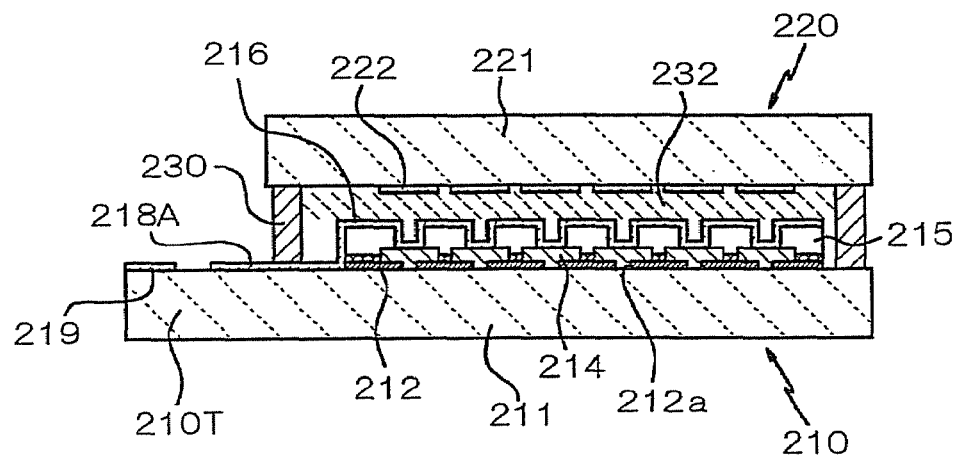
FIG. 15 is a schematic sectional view schematically illustrating the main structure of the liquid crystal display panel according to the first embodiment.
Figure 16:
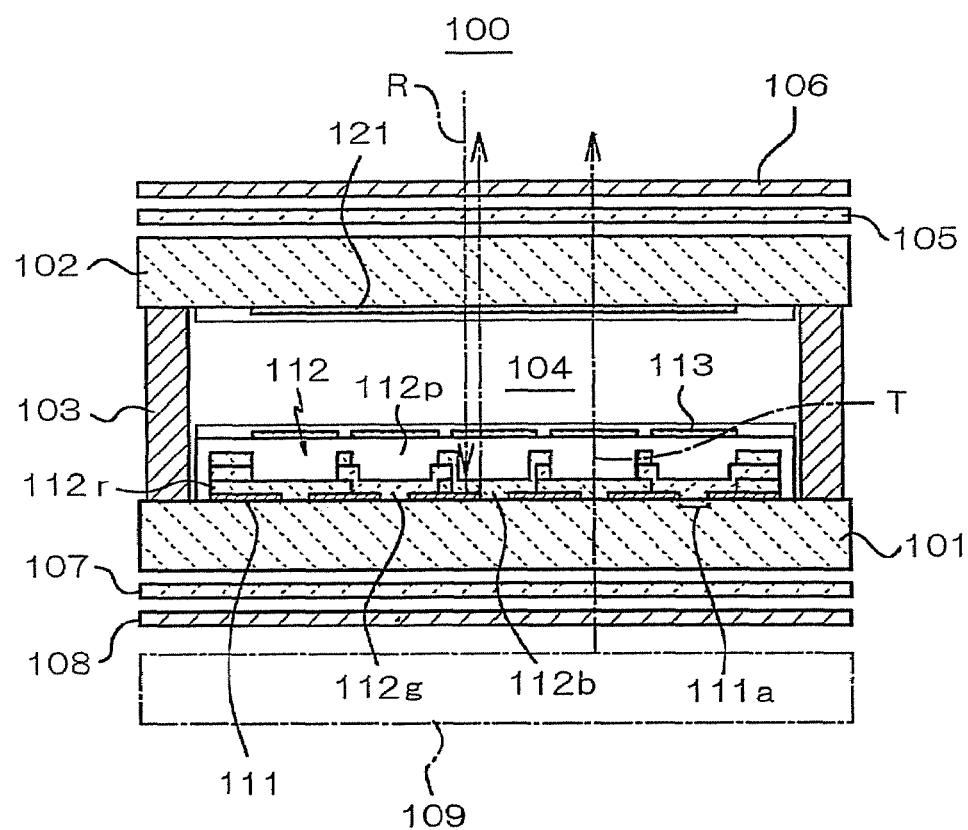
FIG. 16 is a schematic sectional view schematically illustrating the structure of the transflective liquid crystal display panel having a known, conventional, structure.

Referring now to FIGS. 11(a) to 11(e) and FIG. 15, fabrication methods of the liquid crystal device and the liquid crystal device board according to fabrication method embodiments of the present invention will be described in detail. The liquid crystal device fabricated in this embodiment has the liquid crystal display panel 200 according to the first embodiment shown in FIG. 1. Referring to FIG. 15, the schematic structure of the liquid crystal display panel 200 shown in FIG. 1 will be described first. FIG. 15 is a schematic illustration of a state in which the semiconductor IC and the flexible wiring board of the liquid crystal display panel 200 shown in FIG. 1 are not mounted. In the drawing, the size of the liquid crystal display panel 200 is adjusted for convenience of illustration as necessary, and some of its components are omitted as necessary.

The liquid crystal display panel 200 is constructed such that the color filter substrate 210, which has the first substrate 211 having the reflective layer 212, the coloring layers 214, and the overcoat layer 215 laminated thereon, and which has the transparent electrodes 216 formed on the overcoat layer 215, and the counter substrate 220 facing the color filter substrate 210 are bonded to each other with the sealing adhesive 230, and the liquid crystal 232 is disposed therebetween. The transparent electrodes 216 are connected to the wiring lines 218A as described above, and the wiring lines 218A pass between the sealing adhesive 230 and the first substrate 211 and are lead out onto the surface of the substrate overhang 210T. The substrate overhang 210T also has the input terminal unit 219 formed thereon.

FIGS. 11(a) to 11(e) illustrate a fabrication process for fabricating the color filter substrate 210 included in the liquid crystal display panel shown in FIG. 15.

Figure 11:
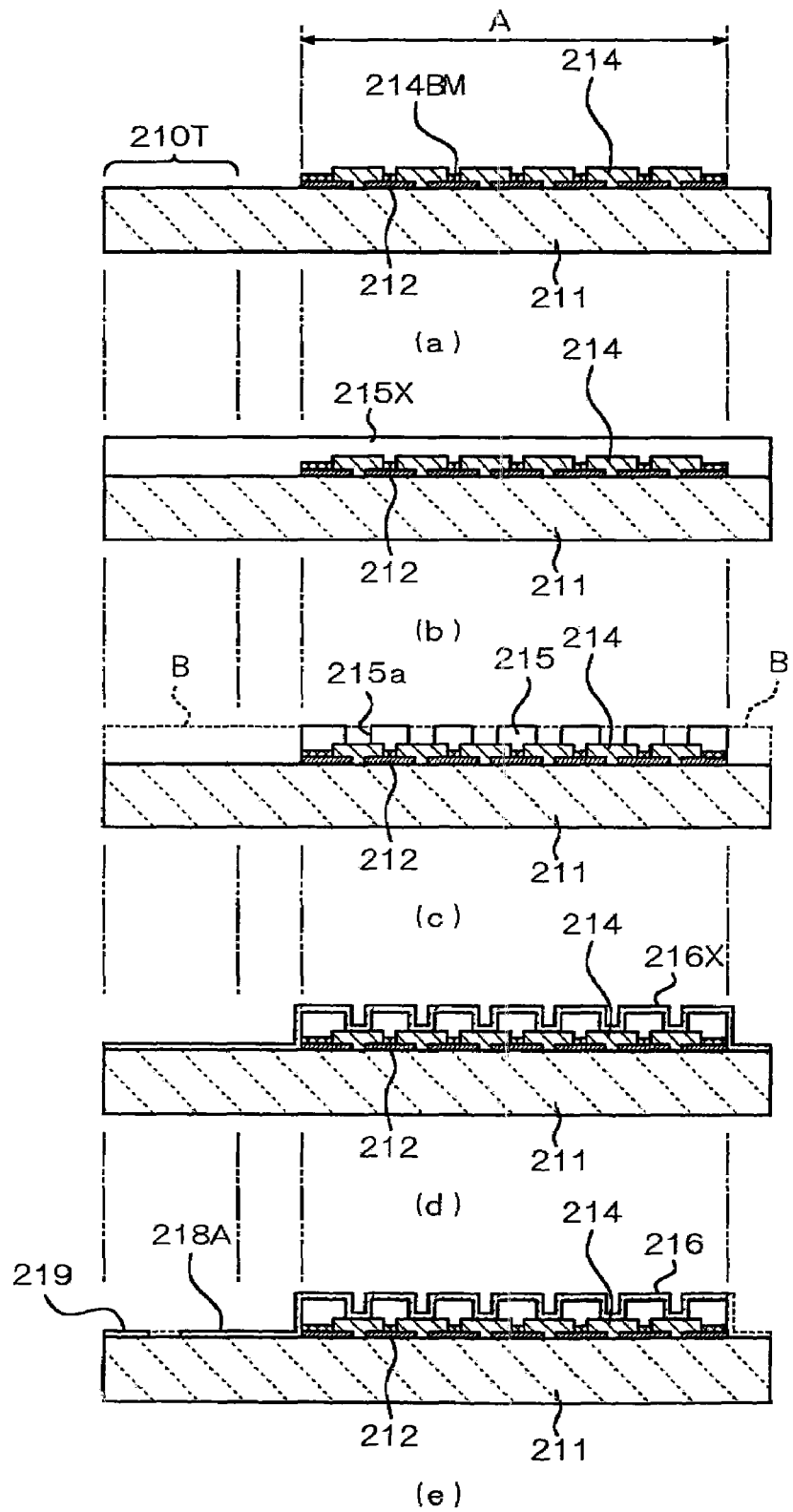
FIG. 11 includes schematic process charts FIGS. 11(a) to 11(e) of fabrication methods of the liquid crystal device of the present invention according to fabrication method embodiments of the present invention.

First, as shown in FIG. 11(a), the reflective layer 212, the black matrix film 214BM, and at least one part of the coloring layers 214 corresponding to a single color are sequentially formed on the first substrate 211 in the region corresponding to the liquid crystal display region A shown in FIG. 1. The reflective layer 212 having the apertures 212a therein is formed such that a metal material or the like is deposited on the substrate by chemical vapor deposition or sputtering, and then the deposited film is sputtered by lithography and etching. Also, the black matrix film 214BM and that part of the coloring layers 214 are formed such that a photosensitive resin made from a transparent resin or the like containing a colorant such as a pigment or a dye dispersed therein is coated on the reflective layer 212, and subsequently the coated film is exposed and then developed. When the coloring layers 214 corresponding to a plurality of colors are to be formed in an array, the above step is repeated for each color.

Basically, the above described laminated structure is not formed in the regions (including a region on the substrate overhang 210T) of the liquid crystal panel 200 excluding the liquid crystal display region A.

Then, as shown in FIG. 11(b), the first substrate 211 has a light-transmissive protection layer 215X formed on the entire surface thereof. The light-transmissive protection layer 215X is made from, for example, an acrylic resin, an epoxy resin, an imide resin, a fluorine resin, or the like. One of these fluid resins in an uncured state is coated on the substrate and is cured by an appropriate means including drying, photo-curing, and heat-curing. A method such as spin coating or printing is employed as the coating method.

Subsequently, by patterning the light-transmissive protection layer 215X by photolithography and etching, as shown in FIG. 11(c), the overcoat layer 215 is formed so as to be restricted to the liquid crystal display region A. At the same time, the apertures 215a are formed in the overcoat layer 215. In this step, the light transmissive material which lies in the region B and does not lie in the liquid crystal display region A is removed from the light-transmissive protection layer 215X, wherein the region B substantially corresponds to portions (including a portion on the substrate overhang 210T) of the light-transmissive protection layer 215X, the portions being formed outside the sealing adhesive 230 as shown in FIG. 15.

Although the present invention is characterized in that the apertures 215a, the depressions 315b, or the thin portions 315c are formed in the overcoat layer 215 (refer to the second embodiment), as described above, the apertures, the depressions, or the thin portions can be formed at the same time as when the overcoat layer 215 is patterned, and thus the color filter substrate 210 can be fabricated only by changing the patterning pattern without increasing the number of man-hours or putting additional effort into the conventional fabrication process.

Subsequently, as shown in FIG. 11(d), a transparent conductive layer 216X formed of a transparent conductor made from ITO (indium tin oxide) or the like is formed on the entire surface of the substrate. The transparent conductive layer 216X is deposited by sputtering. Then, by patterning the transparent conductive layer 216X by photolithography and etching, the transparent electrodes 216, the wiring lines 218A, and the input terminal unit 219 are formed all at the same time, as shown in FIG. 11(e). Although not shown in these drawings, the wiring lines 218B shown in FIG. 1 are formed at the same time in the above described step.

A fabrication method of the foregoing liquid crystal device board includes a step for forming a reflective layer having apertures on the substrate, a step for forming coloring layers on the reflective layer, and a step for forming a substantially light-transmissive protection layer having apertures or thin portions in the regions which overlap the apertures of the reflective layer above the coloring layers. In the step for forming the protection layer, the apertures or the thin portions of the protection layer form depressions on the surface of the protection layer. With this arrangement, when the transflective liquid crystal device is constructed with this substrate, by disposing the apertures or the thin portions in the protection layer so as to form the depressions on the surface thereof, the liquid crystal layer in the regions where the apertures of the reflective layer are disposed can be made thicker than in the other regions. More particularly, since the protection layer formed on the coloring layers is generally thicker than the other layered components (e.g., the reflective layer and the transparent electrodes) forming the layer structure, the depressions for making portions of the liquid crystal layer thicker can be easily formed.

It is preferable that the step for forming the protection layer include a processing phase for removing at least a part of the material forming the protection layer from portions of the protection layer, the portions overlapping the regions where the coloring layers are not formed and where the apertures of the reflective layer are formed, and the apertures or the thin portions of the protection layer are formed in this processing phase. When the step for forming the protection layer includes a processing phase (i.e., the patterning processing phase) for removing at least a part of the transmissive material in the regions where the coloring layers on the substrate are not formed, the apertures or the thin portions are formed at the same time in this processing phase, whereby the conventional fabrication method can be applied simply by changing the patterning pattern without increasing the number of man-hours into the fabrication process.

A fabrication method of the liquid crystal device includes a step for forming a reflective layer having apertures on the substrate, a step for forming coloring layers on the reflective layer, a step for forming a substantially light-transmissive protection layer having apertures or thin portions in the regions which overlap the apertures of the reflective layer above the coloring layers, and a step for disposing liquid crystal on the protection layer. In the step for disposing the liquid crystal, the liquid crystal is infused into depressions formed by the apertures or thin portions of the protection layer. With this arrangement, the depressions are formed by the apertures or the thin portions of the protection layer and the depressions are filled with the liquid crystal, whereby the liquid crystal layer can be made thicker in the regions where the apertures of the reflective layer are disposed. In particular, since an additional layer is not needed and, furthermore, since the protection layer has a sufficient thickness, the thickness of the liquid crystal layer can be easily changed so as to improve the utilization efficiency of light necessary to achieve the transmissive display.

Also, another fabrication method of the liquid crystal device according to the present invention includes a step for forming a reflective layer having apertures on one of a pair of substrates, a step for forming coloring layers on the reflective layer, a step for forming a substantially light-transmissive protection layer having apertures or thin portions in the regions which overlap the apertures of the reflective layer above the coloring layers, and a step for disposing liquid crystal between the pair of substrates. In the step for disposing the liquid crystal, the liquid crystal is infused into depressions formed by the apertures or thin portions of the protection layer.

Furthermore, another fabrication method of the liquid crystal device according to the present invention includes a step for forming a reflective layer having apertures on one of a pair of substrates, a step for forming coloring layers on the other one of the pair of substrates, a step for forming a substantially light-transmissive protection layer having apertures or thin portions in the regions which overlap the apertures of the reflective layer above the coloring layers, and a step for disposing liquid crystal between the pair of substrates. In the step for disposing the liquid crystal, the liquid crystal is infused into depressions formed by the apertures or thin portions of the protection layer.

In any of the above described fabrication methods, it is preferable that the step for forming the protection layer include a processing phase for removing at least a part of the material forming the protection layer from portions of the protection layer, the portions overlapping the regions where the coloring layers are not formed and where the apertures of the reflective layer are formed, and the apertures or the thin portions of the protection layer are formed in this processing phase.

Figure 17:
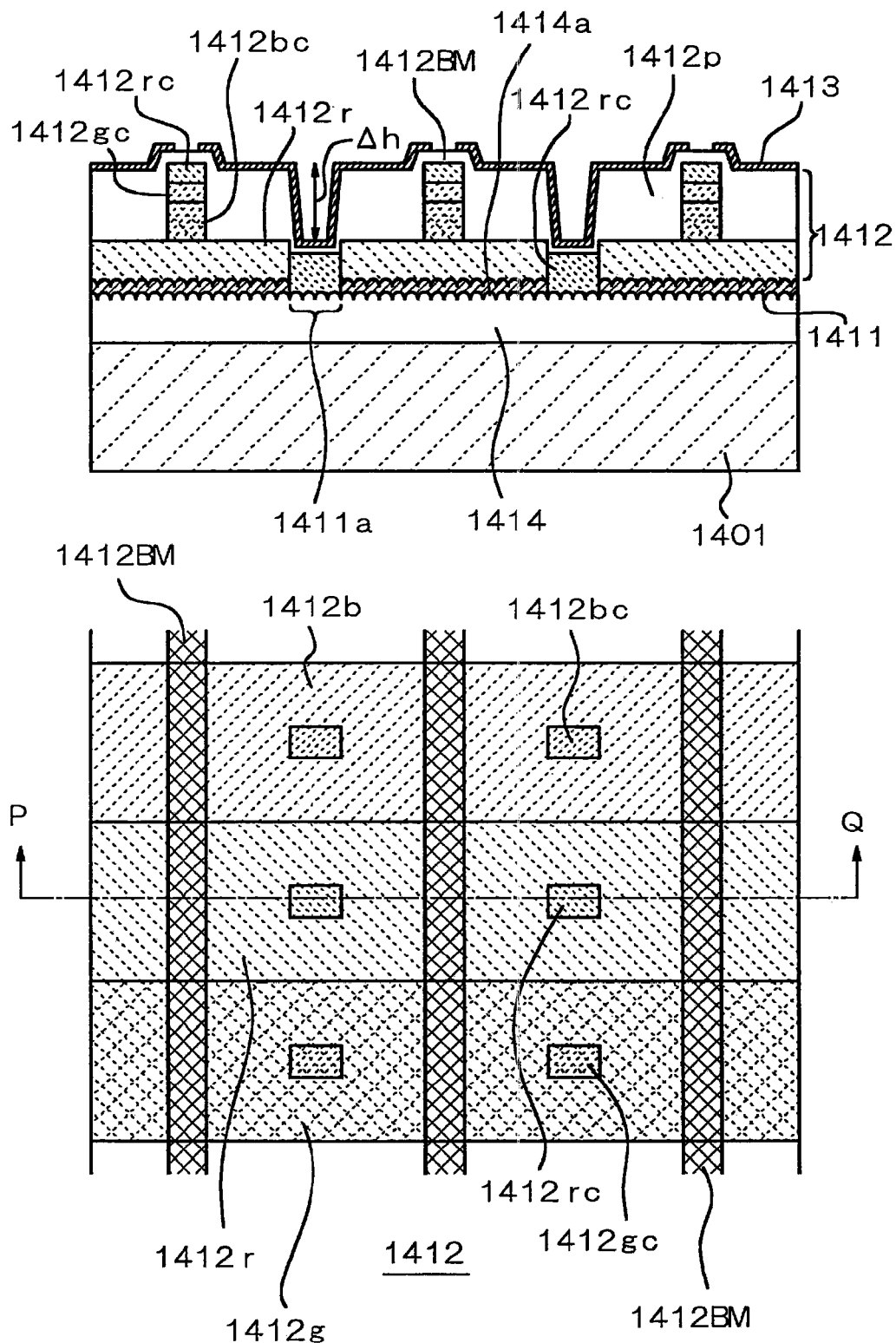
FIG. 17 illustrates a magnified sectional view of part of a color filter substrate as an example and a plan view of a color filter as an example so as to demonstrate the structure in more detail.

Referring now to FIG. 17, a further detailed example applicable to the above described embodiments will be described. FIG. 17 includes an enlarged partial sectional view schematically illustrating a part of the sectional structure of the color filter substrate and a schematic plan view of a part of the color filter lying in the region corresponding to the color filter substrate, wherein the enlarged partial sectional view is taken along the line P-Q indicated in the schematic plan view.

In this example, a substrate 1401 has a light-transmitting layer 1414 formed thereon. The light-transmitting layer 1414 is made from a light-transmissive material such as a transparent material, and, in particular, is preferably formed from an organic insulative material. The light-transmitting layer 1414 has an indented pattern, that is, a regularly or irregularly repeated pattern of peaks and troughs, formed on a surface 1414a. The indented pattern is formed by selectively removing the transparent material by etching or the like so as to form an indented shape, and, in some cases, by additionally imparting fluidity to the transparent material having the foregoing indented shape with heat or the like so as to smooth the indented shape. The light-transmitting layer 1414 is about 2 µm thick, for example. Instead of forming the light-transmitting layer 1414, the substrate 1401 may have an indented pattern formed on the surface thereof by etching or the like. Also, instead of disposing such a light-transmitting layer 1414, or forming an indented pattern on the surface of the substrate 1401, a diffusing layer, a scattering layer, or the like may be disposed closer to the observation side than to a reflective layer, which will be described later.

The light-transmitting layer 1414 has a reflective layer 1411 formed thereon made from Al, an Al alloy, silver, an APC alloy, or the like. The reflective layer 1411 is formed by sputtering, chemical vapor deposition, or the like. The reflective layer 1411 has an indented reflective surface since it is formed on the surface of the light-transmitting layer 1414. The reflective layer 1411 is about 0.2 μm thick, for example, and has one aperture 1411a at each pixel.

The light-transmitting layer 1414 and the reflective layer 1411 have a color filter 1412, made from a known photosensitive resin or the like, formed thereon. The color filter 1412 includes coloring layers having hyperchromic portions 1412rc (red hyperchromic portions), 1412gc (green hyperchromic portions), and 1412bc (blue hyperchromic portions) formed on the apertures 1411a, and hypochromic portions 1412r (red hypochromic portions), 1412g (green hypochromic portions), and 1412b (blue hypochromic portions) formed on a reflective layer 1411.

Also, the hypochromic portions 1412r, 1412g, and 1412b have one stacked black matrix film 1412BM, which comprises the hyperchromic portions 1412rc, 1412gc, and 1412bc laminated therein, formed in each space between two adjacent pixels. The stacked black matrix film 1412BM is constructed such that, for example, the hypochromic portion 1412b, the hypochromic portion 1412g, and the hypochromic portion 1412r are laminated sequentially from the bottom so as to be about 1.0 μm thick, about 0.5 μm thick, and about 0.5 μm thick, respectively.

The coloring layers formed as described above have protection layers 1412p formed thereon, wherein the protection layers 1212p are formed of a light transmissive material made from an acrylic resin or the like. The protection layers 1412p are formed on the hypochromic portions 1412r, 1412g, and 1412b, but are not formed on the hyperchromic portions 1412rc, 1412gc, and 1412bc. The protection layers 1412p are formed such that, for example, an inorganic layer or an organic layer is formed on the entire surface of the color filter 1412, and then portions of the layer lying directly above the apertures 1411a are selectively removed by photolithography or the like. The protection layers 1412p are made from a transparent organic resin such as an acrylic resin or an epoxy resin, or from a transparent inorganic material such as $SiO_2$ or $TiO_2$. The protection layers 1412p are about 2.2 μm thick, for example.

The protection layers 1412p have transparent electrodes 1413, formed of a transparent conductor, formed thereon. Since the transparent electrodes 1413 are formed on the protection layers 1412p, the transparent electrodes 1413 have a sectional profile directly affected by the presence of the protection layers 1412p, leading to a typical height difference Δh between the portions where the protection layers 1412p exist and the other portions where the protection layers 1412p do not exist. The height difference Δh is about 2.0 μm, for example. The spaces between the adjacent transparent electrodes 1413 lie above the corresponding stacked black matrix films 1412BM. Each space between the adjacent transparent electrodes 1413 shown in the drawings is about 8 to 10 μm.

In this example, since the stacked black matrix films 1412BM are formed by laminating the hyperchromic portions 1412rc, 1412gc, and 1412bc, the light transmission of this laminated structure can be reduced compared to the structure in which the hypochromic portions are laminated, and accordingly light-shielding in the regions between the adjacent pixels can be achieved more effectively. In addition, since each of the stacked black matrix films 1412BM is stacked directly on any one of the hypochromic portions 1412r, 1412g, and 1412b formed in the pixel regions, the light transmission in the regions where the stacked black matrix films 1412BM are disposed can be further reduced and also the height difference Δh can be easily achieved. Although each stacked black matrix film 1412BM has a three-layered structure on the hypochromic portion, the stacked black matrix film 1412BM may have a two-layered structure or a single-layered structure.

In this example, when the color filter substrate is configured by using the example dimensions shown above, the overall thickness of the color filter substrate is 5.2 to 5.3 μm. Accordingly, a TN liquid crystal display panel or an STN liquid crystal display panel can be configured by providing the liquid crystal layer in the reflective regions with thickness of 3.25 μm. With this arrangement, the thickness of the liquid crystal layer in the transmissive regions is 5.25 μm. The liquid crystal layer is formed of a nematic liquid crystal, has a twist angle Tw of about 60 degrees, and satisfies the foregoing condition (2). Since the liquid crystal layer is about 60% thicker in the transmissive regions than in the reflective regions, the light transmission for both reflective display and transmissive display can be improved by optimizing the retardation of the liquid crystal layer, and, as a result, bright display can be achieved.

Figure 18:
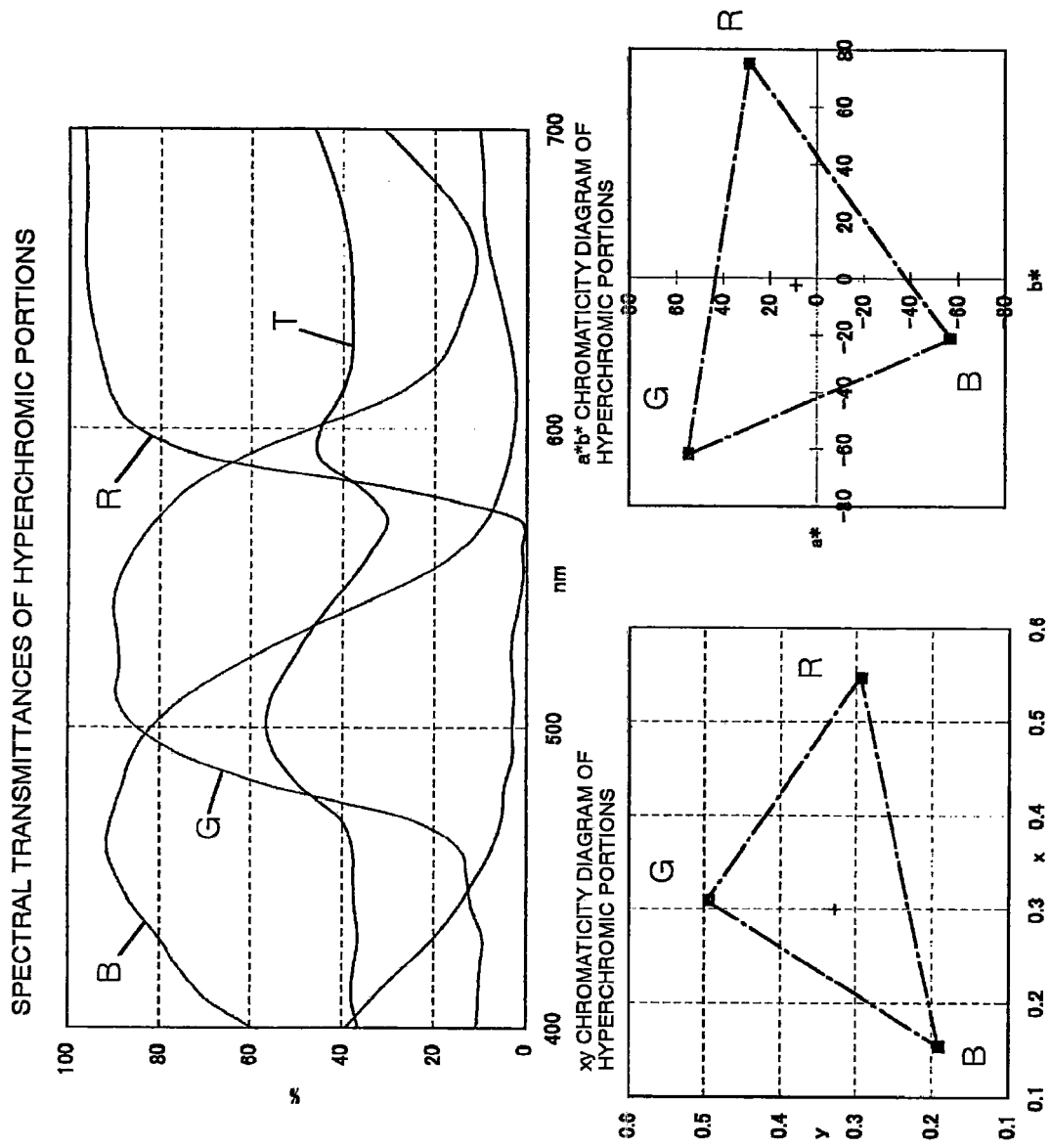
FIG. 18 includes FIGS. 18(a), 18(b), and 18(c) illustrating diagrams of spectral transmittances, xy chromaticity, and a*b*chromaticity, respectively, of light passing through hyperchromic portions of the above-mentioned example color filter.
Figure 19:
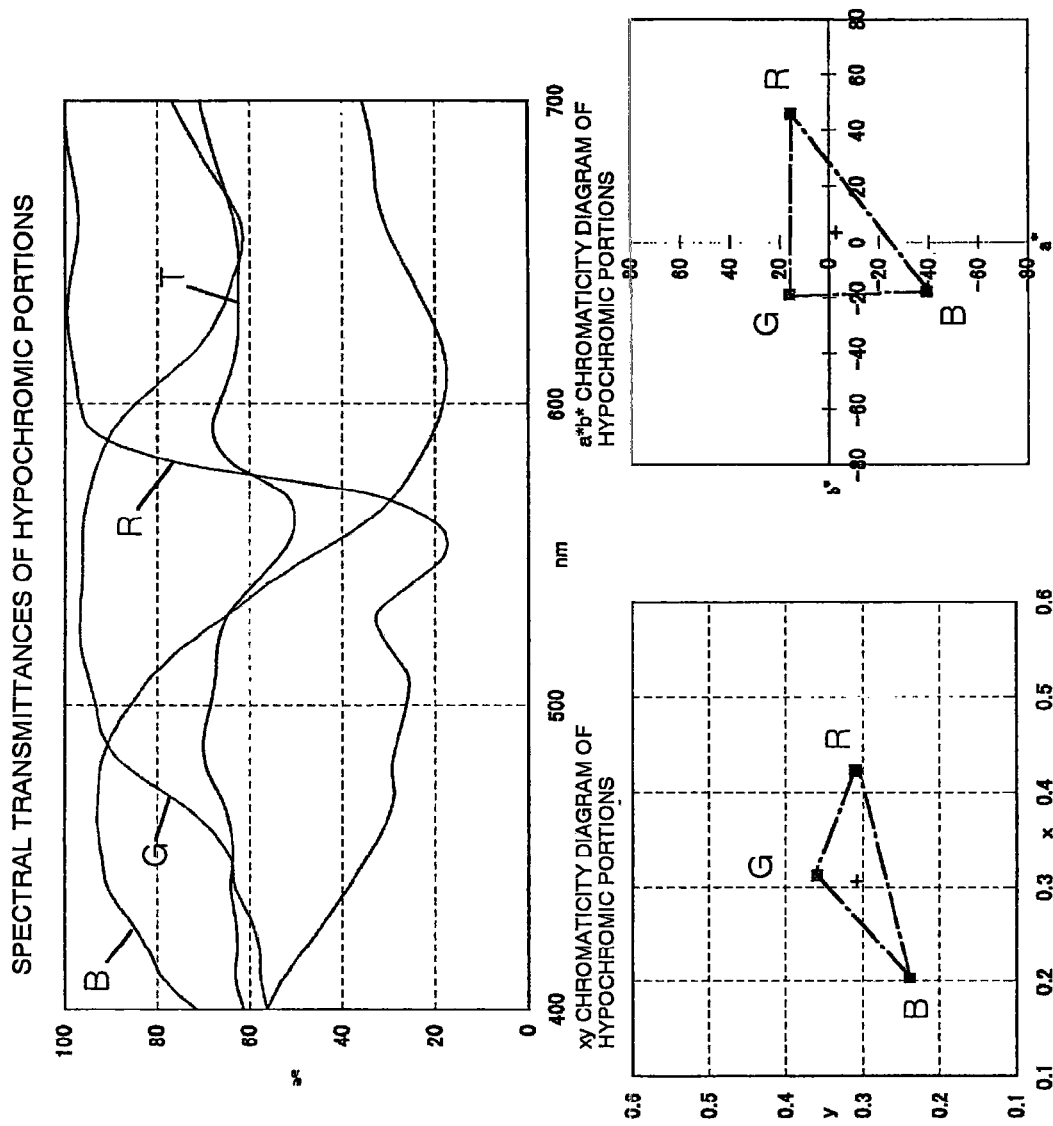
FIG. 19 includes FIGS. 19(a), 19(b), and 19(c) illustrating diagrams of spectral transmittances, xy chromaticity, and a*b*chromaticity, respectively, of light passing through hypochromic portions of the above-mentioned example color filter.

Referring now to FIGS. 18 and 19, a structural example of the color filter 1412 according to the foregoing example of the present invention will be described. This structural example is applicable not only to the color filter in the foregoing example but also to those in the foregoing embodiments. FIGS. 18(*a*), 18(*b*), and 18(*c*) are diagrams of spectral transmittances, xy chromaticity in the CIE colorimetric system (1931), and a*b* chromaticity in the CIE calorimetric system (1976), respectively, of light passing through the hyperchromic portions of the above-described color filter. FIGS. 19(*a*), 19(*b*), and 19(*c*) are diagrams of spectral transmittances, xy chromaticity in the CIE calorimetric system (1931), and a*b* chromaticity in the CIE calorimetric system (1976), respectively, of light passing through the hypochromic portions of the above-described color filter. These diagrams illustrate the results in which light from the same C light source is transmitted once through each hyperchromic portion or each hypochromic portion and the spectral transmittance and the chromaticity coordinates of the transmitted light after one pass are analyzed.

As shown in FIG. 18, the major transmissive wavelength range of the light passing through the red hyperchromic portion (R) lies from 600 to 700 nm, the mean light transmission in this range is about 90%, and, in particular, the maximum light transmission (about 95%) is in the range of 640 to 700 nm. The major transmissive wavelength range of the light passing through the green hyperchromic portion (G) lies from 495 to 570 nm, the mean light transmission in this range is about 85%, and, in particular, the maximum light transmission (about 90%) is in the range of 510 to 550 nm. The major transmissive wavelength range of the light passing through the blue hyperchromic portion (B) lies from 435 to 500 nm, the mean light transmission in this range is about 85%, and, in particular, the maximum light transmission (about 88%) is in the range of 445 to 480 nm.

Also, Y values in the CIE colorimetric system (1931) of the light passing through the red hyperchromic portion (R), the green hyperchromic portion (G), and the blue hyperchromic portion (B) are about 24 to 26, 70 to 72, and 29 to 31, respectively. L* values in the CIE colorimetric system (1976) of the light passing through the red hyperchromic portion (R), the green hyperchromic portion (G), and the blue hyperchromic portion (B) are about 56 to 58, 86 to 88, and 60 to 62, respectively.

In addition, the areas of two triangles formed by two groups of three apexes in the two chromaticity diagrams corresponding to the chromaticity values of the light passing through the red hyperchromic portion (R), the green hyperchromic portion (G), and the blue hyperchromic portion (B) are about 0.05 (in the xy chromaticity diagram) and about 7000 (in the a*b* chromaticity diagram).

On the other hand, as shown in FIG. 19, the major transmissive wavelength range of the light passing through the red hypochromic portion (R) lies from 585 to 700 nm, the mean light transmission in this range is about 93%, and, in particular, the maximum light transmission (about 96%) is in the range of 590 to 700 nm. The major transmissive wavelength range of the light passing through the green hypochromic portion (G) lies from 480 to 600 nm, the mean light transmission in this range is about 92%, arid, in particular, the maximum light transmission (about 94%) is in the range of 500 to 580 nm. The major transmissive wavelength range of the light passing through the blue hypochromic portion (B) lies from 430 to 510 nm, the mean light transmission in this range is about 89%, and, in particular, the maximum light transmission (about 92%) is in the range of 440 to 500 nm.

Also, Y values in the CIE colorimetric system (1931) of the light passing through the red hypochromic portion (R), the green hypochromic portion(G), and the blue hypochromic portion (b) are about 46 to 48, 89 to 91, and 44 to 46, respectively. L* values in the CIE calorimetric system (1976) of the light passing through the red hypochromic portion (R), the green hypochromic portion (G), and the blue hypochromic portion (B) are about 73 to 75, 95 to 97, and 72 to 74, respectively.

In addition, the areas of two triangles formed by two groups of three apexes in the two chromaticity diagrams corresponding to the chromaticity values of the light passing through the red hypochromic portion (R), the green hypochromic portion (G), and the blue hypochromic portion (B) are about 0.01 (in the xy chromaticity diagram) and about 1700 (in the a*b* chromaticity diagram).

As described above, when the optical density features of the hyperchromic portions and the hypochromic portions are compared to each other, the Y values corresponding to luminous transmission, or the L* values corresponding to brightness, of the hypochromic portions are greater than those of the hyperchromic portions. These values of the hypochromic portions are preferably about 1.2 to 2.5 times as large as those of the hyperchromic portions. Also, regarding the triangular areas in the chromaticity diagrams corresponding to chroma, the triangular area in the chromaticity diagram of the hyperchromic portions is greater than that of the hypochromic portions, and is preferably about 3 to 8 times as large as that of the hypochromic portions.

The optical density can be defined not only by the optical characteristics described above but also by the fabrication conditions or the structure of the color filter. For example, the magnitude relation of the amount of a colorant such as a pigment or a dye, which is mixed in the coloring layers in a dispersed state when the coloring layers of the color filter are formed, can be used as a definition factor. That is, the amount (weight or volume) of the colorant per unit volume of the hyperchromic portions is designed to be greater than that of the hypochromic portions.

As described above, since suitable color display in the transmissive display and the reflective display can be achieved by providing the coloring layers of the color filter with the hyperchromic portions in the transmissive regions and the hypochromic portions in the reflective regions, respectively, in the above described example, the improvement in the light transmission obtained by setting the liquid crystal thickness a of the reflective regions and the liquid crystal thickness b of the transmissive regions in the foregoing ranges can be utilized more effectively, and thus high-definition color display can be achieved.

Figure 13:
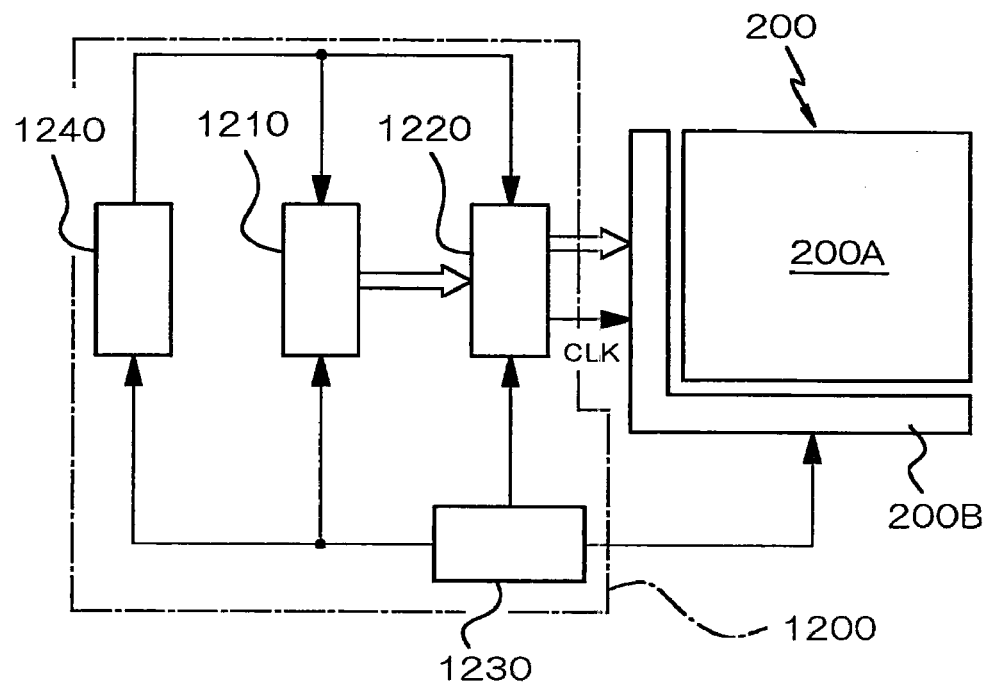
FIG. 13 is a schematic block diagram illustrating the configuration of an electronic apparatus according to the present invention.

Lastly, an electronic apparatus according to an electronic apparatus embodiment will be described wherein the electronic apparatus uses a liquid crystal device, including the foregoing liquid crystal display panel, as a display device. FIG. 13 is a schematic block diagram illustrating the overall configuration of this embodiment. An electronic apparatus shown in this drawing has the liquid crystal display panel 200, the same as described above, and control means 1200 for controlling it. In the drawing, the liquid crystal display panel 200 is conceptually illustrated so as to have a panel structure 200A and a drive circuit 200B including a semiconductor IC and so forth. The control means 1200 includes a display-information output source 1210, a display-information process circuit 1220, a power circuit 1230, and a timing generator 1240.

The display-information output source 1210 has a memory such as a ROM (read only memory) and a RAM (random access memory), a storage unit including a magnetic storage disk, an optical storage disk, and so forth, and a tuning circuit for outputting a tuned digital image signal, and sends display information in the form of an image signal and the like with a predetermined format to the display-information process circuit 1220 in response to a variety of clock signals generated by the timing generator 1240.

The display-information process circuit 1220 has a variety of known circuits such as a serial-parallel conversion circuit, an amplification and reversion circuit, a rotation circuit, a gamma correction circuit, and a clamp circuit, processes the input display information, and sends the processed image information together with a clock signal CLK to the drive circuit 200B. The drive circuit 200B includes a scan line drive circuit, a data line drive circuit, and a testing circuit. The power circuit 1230 feeds a predetermined voltage to each of the above described components.

Figure 14:
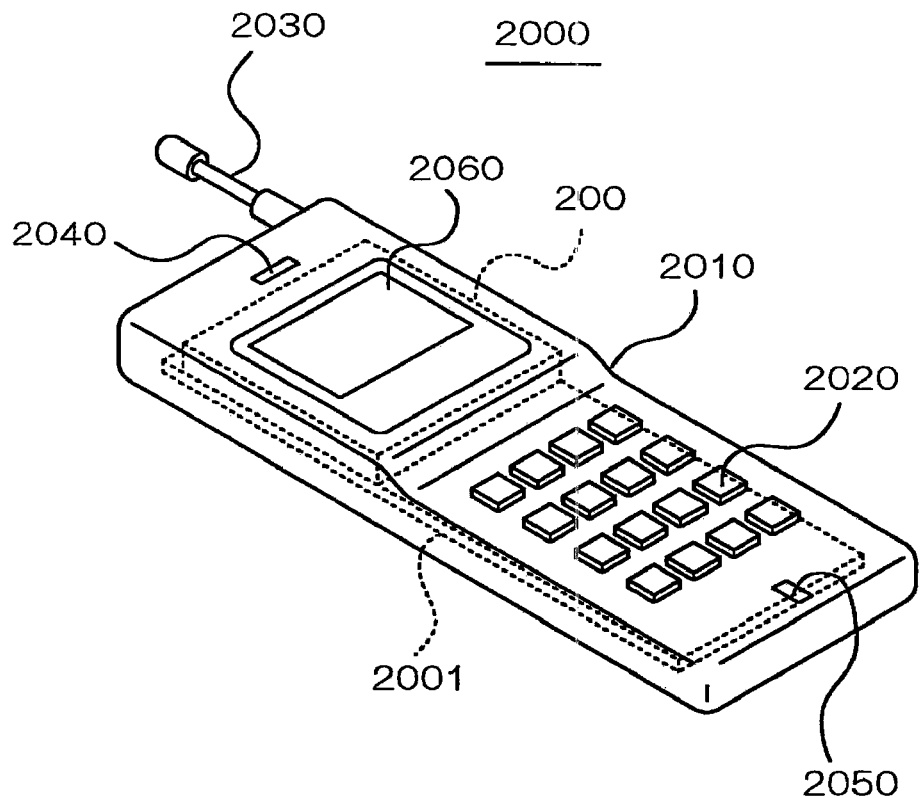
FIG. 14 is a perspective view of the external appearance of a portable phone as an example of the electronic apparatus.

FIG. 14 illustrates a portable phone as an example of the electronic apparatus according to this embodiment of the present invention. A portable phone 2000 is constructed such that a casing 2010 has a circuit board 2001 disposed therein and the circuit board 2001 has the foregoing liquid crystal display panel 200 mounted thereon. The casing 2010 has an array of operation buttons 2020 on the front surface thereof and an antenna 2030 retractably attached at one end thereof. A receiver 2040 has a speaker disposed therein and a transmitter 2050 has a built-in microphone therein.

The display surface (the foregoing liquid crystal display region A) of the liquid crystal display panel 200 installed in the casing 2010 is visible through a display window 2060.

The liquid crystal device and the electronic apparatus according to the present invention are not limited to the foregoing examples illustrated in the drawings, but those skilled in the art will appreciate that various modifications can be made without departing from the spirit of the present invention. For example, although the liquid crystal display panel described in the foregoing embodiments has a passive matrix structure, the present invention is applicable to a liquid crystal device of an active matrix type using an active element such as a TFT (thin film transistor) or a TFD (thin film diode). Furthermore, although the liquid crystal display panel according to the foregoing embodiments has a so-called COG type structure, the present invention is applicable to a liquid crystal display panel on which an IC chip is not directly mounted, for example to a liquid crystal display panel to which a flexible wiring board or a TAB board is connected.

As described above, according to the present invention, since the utilization efficiency of transmitted light necessary to achieve the transmissive display is improved, the amount of illuminating light necessary to achieve the transmissive display can be reduced, and also the reflective display can be made brighter by reducing the areas of the apertures in the reflective layer. In addition, since these are achieved simply by providing apertures or thin portions in the protection layer on the coloring layers, the liquid crystal device according to the present invention can be fabricated without complicating its fabrication process.

The invention claimed is:

1. A liquid crystal display device comprising:
   a first substrate;
   a second substrate opposing the first substrate;
   a liquid crystal layer disposed between the first and second substrates;
   a plurality of pixels;
   a reflective layer disposed between the first substrate and the liquid crystal layer, the reflective layer being located at a portion of each pixel so that the portion of each pixel is a reflection region of the pixel and another portion of each pixel other than the portion is a transmissive region of the pixel;
   a coloring layer disposed between the second substrate and the liquid crystal layer, the coloring layer having an edge;
   a substantially-transmissive protection layer disposed between the liquid crystal layer and the coloring layer, the protection layer covering at least a portion of the coloring layer, the protection layer including apertures that overlap the transmissive region of each pixel and cause the liquid crystal layer to be thicker in the transmissive region than in the reflection region; and
   a light-shielding film overlapping the edge of the coloring layer.

2. The liquid crystal display device according to claim 1, the plurality of pixels including two adjacent pixels, the light-shielding film overlapping the edge of the coloring layer at a position between the adjacent pixels.

3. The liquid crystal display device according to claim 1, the coloring layer riding over an edge of the light-shielding film and onto a surface of the light-shielding film.

4. The liquid crystal display device according to claim 1, the coloring layer contacting an end edge of light-shielding film.

5. The liquid crystal display device according to claim 1, further comprising another coloring layer, the light-shielding film being disposed between the coloring layer and the other coloring layer.

6. The liquid crystal display device of claim 1, wherein a surface of the liquid crystal layer adjacent the first substrate is entirely planar.

7. A liquid crystal display device comprising:
   a first substrate;
   a second substrate opposing the first substrate;
   a liquid crystal layer disposed between the first and second substrates;
   two adjacent pixels;
   a reflective layer disposed between the first substrate and the liquid crystal layer, the reflective layer being located at a portion of each pixel so that the portion of each pixel is a reflection region of the pixel and another portion of each pixel other than the portion is a transmissive region of the pixel;
   a coloring layer disposed between the second substrate and the liquid crystal layer;
   a substantially-transmissive protection layer disposed between the liquid crystal layer and the coloring layer, the protection layer covering at least a portion of the coloring layer, the protection layer including apertures that overlap the transmissive region of each pixel and cause the liquid crystal layer to be thicker in the transmissive region than in the reflection region; and
   a light-shielding film disposed between the adjacent pixels.

8. The liquid crystal display device according to claim 7, further comprising another coloring layer, the light-shielding film being disposed between the coloring layer and the other coloring layer.

9. The liquid crystal display device of claim 7, wherein a surface of the liquid crystal layer adjacent the first substrate is entirely planar.

10. A liquid crystal display device comprising:
    a first substrate;
    a second substrate opposing the first substrate;
    a liquid crystal layer disposed between the first and second substrates;
    a plurality of pixels;
    a coloring layer disposed between the second substrate and the liquid crystal layer;
    a substantially-transmissive protection layer disposed between the liquid crystal layer and the coloring layer, the protection layer covering at least a portion of the coloring layer, the protection layer including apertures that overlap the transmissive region of each pixel;
    a reflective layer disposed between the first substrate and the liquid crystal layer, the reflective layer being located at a portion of each pixel so that the portion of each pixel is a reflection region of the pixel and another portion of each pixel other than the portion is a transmissive region of the pixel; and
    a transparent electrode formed directly on the reflective layer
    wherein the apertures that overlap the transmissive region of each pixel cause the liquid crystal layer to be thicker in the transmissive region than in the reflective region.

11. The liquid crystal display device according to claim 10, further comprising a light-shielding film formed between adjacent pixels of the plurality of pixels.

12. The liquid crystal display device according to claim 11, the light-shielding film overlapping an edge of the coloring layer.

13. The liquid crystal display device according to claim 11, the light-shielding film overlapping the edge of the coloring layer at a position between the adjacent pixels.

14. The liquid crystal display device according to claim 11, the coloring layer riding over an edge of the light-shielding film and onto a surface of the light-shielding film.

15. The liquid crystal display device according to claim 11, the coloring layer contacting an end edge of light-shielding film.

16. The liquid crystal display device according to claim 11, further comprising another coloring layer, the light-shielding film being disposed between the coloring layer and the other coloring layer.

17. liquid crystal display device of claim 10, wherein a surface of the liquid crystal layer adjacent the first substrate is entirely planar.

* * * * *